United States Patent
Zilg et al.

(10) Patent No.: US 6,197,849 B1
(45) Date of Patent: Mar. 6, 2001

(54) ORGANOPHILIC PHYLLOSILICATES

(75) Inventors: Carsten Zilg, Feldberg-Falkau; Rolf Mülhaupt; Jürgen Finter, both of Freiburg, all of (DE)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/248,649

(22) Filed: Feb. 11, 1999

(30) Foreign Application Priority Data

Feb. 20, 1998 (CH) .................................................. 0408/98

(51) Int. Cl.[7] .................................................. C08K 9/00
(52) U.S. Cl. .................................................. 523/216
(58) Field of Search .................................................. 523/216

(56) References Cited

U.S. PATENT DOCUMENTS

| | | | |
|---|---|---|---|
| 4,210,574 | 7/1980 | Stephens | 260/42.16 |
| 4,810,734 | 3/1989 | Kawasumi et al. | 523/216 |
| 5,384,196 | * 1/1995 | Inoue | 428/411.1 |
| 5,503,936 | 4/1996 | Blyakhman | 428/413 |

* cited by examiner

*Primary Examiner*—Paul R. Michl
(74) *Attorney, Agent, or Firm*—Michele A. Kovaleski

(57) ABSTRACT

Organophilic phyllosilicates which have been prepared by treating a naturally occurring or synthetic phyllosilicate, or a mixture of such silicates, with a salt of a quaternary or other cyclic amidine compound, or with a mixture of such salts; polymeric systems, in particular thermoplastic polymers and thermosetting polymer systems, preferably epoxy resins, polyurethanes and rubbers, which comprise novel organophilic phyllosilicates, and also shapable moulding materials and finished mouldings in the form of composite materials, in particular in the form of nanocomposites.

26 Claims, 25 Drawing Sheets

ORGANOPHILIC PHYLLOSILICATES

The present invention relates to novel organophilic phyllosilicates, their preparation, and also their use in shapable moulding materials and in finished mouldings or composite materials, in particular in nanocomposites, which preferably comprise the novel organophilic phyllosilicates in exfoliated form.

It is known that organophilic phyllosilicates prepared, for example, by ion exchange, can be used as fillers for thermoplastic materials and also for thermosets, giving nanocomposites. When suitable organophilic phyllosilicates are used as fillers, the physical and mechanical properties of the mouldings thus produced are considerably improved. A particular interesting feature is the increase in stiffness with no decrease in toughness. Nanocomposites which comprise the phyllosilicate in exfoliated form have particularly good properties.

U.S. Pat. No. 4,810,734 has disclosed that phyllosilicates can be treated with a quaternary or other ammonium salt of a primary, secondary or tertiary linear organic amine in the presence of a dispersing medium. During this there is ion exchange or cation exchange, where the cation of the ammonium salt becomes embedded into the space between the layers of the phyllosilicate. The organic radical of the absorbed amine makes phyllosilicates modified in this way organophilic. When this organic radical comprises functional groups the organophilic phyllosilicate is able to enter into chemical bonding with a suitable monomer or polymer. However, the use of the linear amines mentioned in U.S. Pat. No. 4,810,734 has the disadvantage that they decompose thermally at the high temperatures of up to 300° C. usually used for thermoplastics processing and can discolour the product. The formation of decomposition products can lead to emissions and to impairment of mechanical properties, for example impact strength.

Surprisingly, it has now been found that organophilic phyllosilicates which have been prepared by treating phyllosilicates, i.e. using cation exchange with salts of quaternary or other cyclic amidine compounds, have greater thermal stability during processing combined with excellent dispersing effect and interfacial adhesion. When the amidinium compounds according to the invention are used in thermosets there is no change in the stoichiometry of the reactive components, in contrast to the use of linear ammonium salts, and this allows addition to the thermosetting materials of an increased proportion of tillers. If the cyclic amidines used contain reactive groups the organophilic phyllosilicates prepared therewith and used as fillers can be covalently linked to the matrix by grafting. Amidinium ions derived, for example, from hydroxystearic acid or hydroxyoleic acid have surprisingly good layer separation combined with excellent adhesion to a wide variety of polymers and fillers. In contrast to the prior art alkyl groups with nonterminal hydroxyl groups in particular are useful, as well as alkyl substituents with terminal hydroxyl groups. The hydroxyl groups in the alkyl side chain may easily be derivatized in order to tailor a system-specific property spectrum. The compounds also create excellent dispersing effect and interfacial adhesion. It is also surprising that, despite their bulk, the heterocyclic amidine salts according to the invention, with long substituted or unsubstituted alkyl radicals, exchange cations efficiently within the spaces between the layers of the phyllosilicates.

The process therefore allows the cyclic amidine compound in quaternized or, if desired, protonated form to be embedded into the phyllosilicate by cation exchange, and this then to be incorporated as a filler into the thermosetting material, if desired of a thermosetting epoxy resin material, or an addition product to be made from the cyclic amidine compound and a part of an epoxy component of the thermosetting material and the resultant product to be embedded into the phyllosilicate and this material to be processed with the remaining part of the epoxy component to give a moulded material.

The present invention is defined in the patent claims and relates in particular to organophilic phyllosilicates which have been prepared by treating a naturally occurring or synthetic phyllosilicate, or a mixture of such silicates, with a salt of a quaternary or other cyclic amidine compound, or with a mixture of such salts.

The present invention further relates to the preparation of the novel organophilic phyllosilicates, and also to their use in shapable moulding materials and in finished mouldings or composite materials, in particular in the preparation of nanocomposites, which preferably comprise the novel organophilic phyllosilicates in exfoliated form.

The present invention further relates to shapable moulding materials and finished mouldings in the form of composite materials, in particular in the form of nanocomposites, which comprise the novel organophilic phyllosilicates, preferably in exfoliated form.

The present invention further relates to the use of the novel shapable moulding materials for producing coating materials, adhesives, casting resins, coatings, flame retardants, agents with thixotropic effect and/or reinforcing agents.

The present invention further relates to coating materials, adhesives, casting resins, coatings, flame retardants, agents with thixotropic effect and/or reinforcing agents which comprise a novel organophilic phyllosilicate.

The present invention also relates to the use of the amidine compounds of the formula (I) given below for preparing organophilic phyllosilicates.

Phyllosilicates which may be used for preparing organophilic phyllosilicates are in particular naturally occurring or synthetic smectite clay minerals, in particular montmorillonite, saponite, beidelite, nontronite, hectorite, sauconite and stevensite, and also bentonite, vermiculite and halloysite. Preference is given to montmorillonite and hectorite. Preferred phyllosilicates are in particular those in which the distance between layers is from about 0.7 to 1.2 nm (nanometer) and which in the form of the novel organophilic phyllosilicates have a distance of at least 1.2 nm between the layers. The phyllosilicates used preferably have a cation exchange capacity in the range from 50–200 meq/100 g (milliequivalents per 100 grams). Examples of phyllosilicates of this type which may be used are described, for example, in A. D. Wilson, H. T. Posser, Developments in Ionic Polymers, London, Applied Science Publishers, Chapter 2, 1986. Synthetic phylosilicates are obtained, for example, by reacting naturally occurring phyllosilicates with sodium hexafluorosilicate. Synthetic phyllosilicates are obtainable commercially, for example, from CO-OP Chemical Company, Ltd., Tokyo, Japan, and have also been described by that company.

The phyllosilicate montmorillonite, for example, generally has the formula:

where some of the aluminium may have been exchanged for magnesium. The composition varies depending on the deposit from which the silicate has been obtained. A preferred composition of the phyllosilicate has the formula:

$(Al_{3.15}Mg_{0.85})Si_{8.00}O_{20}(OH)_4X_{11.8} \cdot nH_2O$ where X is an exchangeable cation, generally sodium or potassium. The hydroxyl groups given may be exchanged for, for example, fluoride ions. Exchange of hydroxyl groups for fluoride ions gives, for example, the synthetic phyllosilicates.

Preferred organophilic phyllosilicates are those which have been prepared using a cyclic amidine compound of the formula (I):

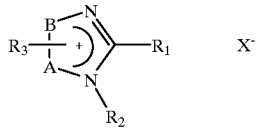
(I)

or using a mixture of such compounds, in which $R_1$ is a linear or branched aliphatic radical having from 1 to 20 C atoms and may contain one or more unsaturated bonds and/or one or more functional groups;

$R_2$ is hydrogen or a linear or branched aliphatic radical having from 1 to 20 C atoms which contains one or more unsaturated bonds and/or one or more functional groups and, if desired, has interruption by one or more —NH— groups or by one or more oxygen atoms;

$R_3$ is hydrogen or a linear or branched aliphatic radical having from 1 to 8 C atoms which may contain one or more unsaturated bonds;

A is —$CH_2$— or —$CH_2$—$CH_2$—;

B is —$CH_2$—; or

A and B together are a radical of the formula —(CH=CH)—, or a radical of the formula =CH—CH= or =CH—$CH_2$—CH= and both of these radicals are part of an annellated, substituted or unsubstituted, cyclohexyl ring, and $X^-$ is any desired anion, for example F, Cl$^-$, Br$^-$, I$^-$, $SO_4^{2-}$, $(HCOO)^-$, or $(CH_3COO)^-$.

In preferred compounds:

$R_1$ is the alkyl radical of a saturated, or the alkenyl radical of an unsaturated, fatty acid or hydroxyl fatty acid having from 8 to 20 C atoms, preferably having from 12 to 20 C atoms, particularly preferably having from 14 to 18 C atoms, or $(C_2-C_8)$alkyl, unsubstituted or substituted by a carboxyl group or by a $(C_1-C_3)$ alkoxycarbonyl group, $R_2$ is hydrogen or an aliphatic radical having from 1 to 8 C atoms and contains an unsaturated bond and which may be substituted by a carboxyl group or by a $(C_1-C_{20})$alkoxycarbonyl group or by a cyclohexylcarbonyl group or by a phenylcarboxyl group, or also hydroxyethyl, aminoethyl, tallow or hydrogenated tallow, and may, if desired, have interruption by —NH— or by oxygen, $R_3$ is hydrogen or $(C_1-C_4)$alkyl;

each of A and B is —$CH_2$—; or

A and B together are the radical —(CH=CH)—, and $X^-$ is any desired anion, for example F$^-$, Cl$^-$, Br$^-$, I$^-$, $SO_4^{2-}$, $C_6H_5SO_3^-$, $CH_3SO_4^-$, $(HCOO)^-$, or $(CH_3COO)^-$.

Particularly preferred compounds have the formula (I'):

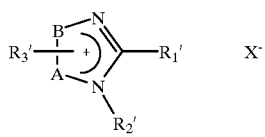
(I')

in which $R_1'$ is the alkenyl radical of 12-hydroxyoleic acid or the alkyl radical of hydrogenated ricinoleic acid (12-hydroxystearic acid), $R_2'$ is hydrogen, or an aliphatic radical having from 1 to 4 C atoms which is unsubstituted or substituted by a $(C_1-C_{20})$alkoxycarbonyl group, or also hydroxyethyl, aminoethyl, tallow or hydrogenated tallow;

$R_3'$ is hydrogen, methyl or ethyl;

each of A and B is —$CH_2$—; or

A and B together are the radical —(CH=CH)—, and $X^-$ is any desired anion, for example F$^-$, Cl$^-$, Br$^-$, I$^-$, $SO_4^{2-}$, $C_6H_5SO_3^-$, $CH_3SO_4^-$, $(HCOO)^-$, or $(CH_3COO)^-$. Each of A and B is preferably —$CH_2$—.

The following compounds and mixtures of such compounds are preferred:

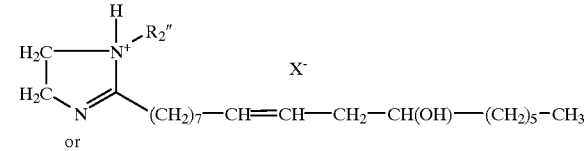

or

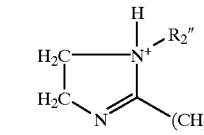

in which $R_2''$ is hydrogen, methyl, ethyl, propyl or butyl, and $X^-$ is any desired anion, for example F$^-$, Cl$^-$, Br$^-$, I$^-$, $SO_4^{2-}$, $C_6H_5SO_3^-$, $CH_3SO_4^-$, $(HCOO)^-$, or $(CH_3COO)^-$;

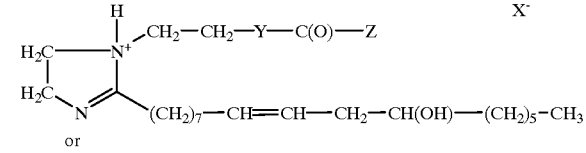

or

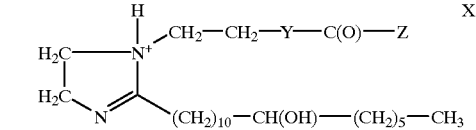

in which

Y is —O— or —NH—, preferably —O—;

Z is a $(C_{12}-C_{20})$alkyl radical or a $(C_{12}-C_{20})$alkenyl radical of an appropriate fatty acid, and $X^-$ is any desired anion, for example F$^-$, Cl$^-$, Br$^-$, I$^-$, $SO_4^{2-}$, $C_6H_5SO_3^-$, $CH_3SO_4^-$, $(HCOO)^-$, or $(CH_3COO)^-$.

The procedure for preparing the cyclic amidine compounds of the formula (I), each of which is in salt form, is firstly to prepare the cyclic amidine compound. This is then converted into the salt form or quaternized. The methods for preparing cyclic amidine compounds are known per se and may also be used for preparing the cyclic amidine compound required as starting material for preparing the quaternized cyclic amidine compounds or salts according to the invention.

For preparing the salts according to the invention or the quaternized cyclic amidine compounds according to the invention use is made of analogous processes known per se, such as have been described for salt formation from, or quaternization of, amines.

The procedure for preparing the novel organophilic phyllosilicates is to convert the amidine compound into the corresponding salt using acid, for example hydrochloric acid, in water, preferably at an elevated temperature in the range from about to 60° C. to 90° C., with stirring and, again with stirring, to add and disperse the phyllosilicate. After sufficient stirring at the temperature given the resultant organophilic phyllosilicate is filtered off, washed with water and dried.

The novel organophilic phyllosilicates are incorporated into a suitable polymer matrix during further processing. Suitable polymers which can be used as matrix are known per se. Preferred polymers for the incorporation process are thermoplastic polymers and thermosetting polymer systems, and also rubbers.

The process here permits not only the embedding of the cyclic amidine compound, in quaternized or, if desired, protonated form, into the phyllosilicate by cation exchange, and this then to be incorporated as a filler into the thermosetting material, if desired of a thermosetting epoxy resin material, but also permits an adduct to be made from the cyclic amidine compound and a part of an epoxy component of the thermosetting material, and the resultant product to be embedded into the phyllosilicate, and this material to be processed with the remaining part of the epoxy component to give a moulded material.

Thermoplastic polymers are selected, for example, from the class encompassing polyolefins, such as polyethylene, polypropylene, polybutylene and polyisobutylene, vinyl polymers, such as poly(vinyl acetate), polyacrylates, polymethacrylates, polyvinyl chlorides, polystyrenes, polyacrylonitriles, polyacetals, thermoplastic polyamides, thermoplastic polyesters, thermoplastic polyurethanes, polycarbonates, polysulfones, poly(alkylene terephthalates), polyaryl ethers, alkylene-vinyl ester copolymers, such as ethylene-vinyl acetate copolymers, styrene-acrylonitrile copolymers and mixtures of these. Preferred polymers are thermoplastic polyesters and thermoplastic polyurethanes, in particular polyurethanes. Thermoplastics and rubbers may also be used in a mixture. These polymers may comprise additives, such as fillers (for example powdered quartz, wollastonite or chalk), lubricants, mould-release agents, plasticizers, foaming agents, stabilizers, flow agents, dyes, pigments or mixtures of these.

Examples of rubbers are polybutadiene, polyisoprene, butadiene copolymers with styrene and acrylonitrile, styrene copolymers with acrylonitrile, butadiene and acrylate and/or methacrylates. Such rubber systems are known per se and are described in Ullmanns Encyclopaedie der Technischen Chemie [Ullmann's Encydopaedia of Industrial Chemistry], Vol. 13, pp. 581 ff., 4th edition, Verlag Chemie Weinheim, New York, 1977.

The thermosetting polymer systems used may be polycondensates or polyadducts. Examples of polycondensates as thermosetting plastics are curable phenol-formaldehyde resins (PF casting resins), curable bisphenol resins, curable urea-formaldehyde resins (UF moulding materials), polyimides (PIs), BMI moulding materials and polybenzimidazoles (PBIs). Examples of polyadducts as thermosetting plastics are epoxy resins (EPs), moulding materials made from unsaturated polyesters resins (UP moulding materials), DAP resins (poly(diallyl phthalate)), MF moulding materials, e.g. curable melamine-phenol-formaldehyde moulding materials, and crosslinked polyurethanes (PUs). Epoxy resins and polyurethanes are preferred.

Preferred curable thermosetting mixtures comprise (a) an epoxy resin having more than one 1,2-epoxy group in the molecule or also their adducts with long-chain carboxylic acids, and (b) at least one suitable hardener, on its own or in a mixture with alkenyl succinates. Suitable epoxy resins which may be used in the curable mixtures are the conventional epoxy resins of epoxy resin technology. Examples of epoxy resins are:

I) Polyglycidyl and poly($\beta$-methylglycidyl) esters obtainable by reacting a compound having at least two carboxyl groups in the molecule with, respectively, epichlorohydrin and $\beta$-methylepichlorohydrin. It is advantageous for the reaction to take place in the presence of bases. The compound having at least two carboxyl groups in the molecule may be an aliphatic polycarboxylic acid. Examples of such polycarboxylic acids are oxalic acid, succinic acid, glutaric acid, adipic acid, pimelic acid, sebacic acid, suberic acid, azelaic acid and dimerized or trimerized linoleic acid. It is, however, also possible to use cycloaliphatic polycarboxylic acids, for example tetrahydrophthalic acid, 4-methyltetrahydrophthalic acid, hexahydrophthalic acid or 4-methylhexahydrophthalic acid. It is, furthermore, possible to use aromatic polycarboxylic acids, for example phthalic acid, isophthalic acid or terephthalic acid.

II) Polyglycidyl or poly($\beta$-methylglycidyl) ethers obtainable by reacting a compound having at least two free alcoholic hydroxyl groups and/or phenolic hydroxyl groups with epichlorohydrin or $\beta$-methylepichlorohydrin under alkaline conditions or in the presence of an acid catalyst and subsequent treatment with alkali. The glycidyl ethers of this type derive, for example, from acyclic alcohols, for example from ethylene glycol, diethylene glycol or higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol or sorbitol, or also from polyepichlorohydrins. They also derive, for example, from cycloaliphatic alcohols, such as 1,4-cyclohexanedimethanol, bis(4-hydroxycydohexyl)methane or 2,2-bis(4-hydroxycyclohexyl)-propane, or they have aromatic rings, for example N,N-bis(2-hydroxyethyl)aniline and p,p'-bis(2-hydroxyethylamino)diphenylmethane. The glycidyl ethers may also derive from mononuclear phenols, for example from resorcinol or hydroquinone, or are based on polynuclear phenols, for example bis(4-hydroxyphenyl)methane, 4,4'-dihydroxybiphenyl, bis-(4-hydroxyphenyl) sulfone, 1,1,2,2-tetrakis-(4-hydroxyphenyl)ethane, 2,2-bis(4-hydroxyphenyl)propane, 2,2-bis(3,5-dibromo-4-hydroxyphenyl)propane, or also from novolaks, obtainable by condensation from aldehydes, for example formaldehyde, acetaldehyde, chloral or furfuraldehyde, with phenols, for example phenol, or with phenols whose ring has substitution by chlorine atoms or by $C_1$–$C_9$alkyl groups, for example 4-chlorophenol, 2-methylphenol and 4-tert-butylphenol, or by condensation with bisphenols, such as those of the type mentioned above.

III) Poly(N-glycidyl) compounds obtainable by dehydrochlorinating the reaction products of epichlorohydrin with amines which contain at least two amine hydrogen atoms. Examples of these amines are aniline, n-butylamine, bis(4-aminophenyl)methane, m-xylylenediamine and bis(4-methylaminophenyl) methane. The poly(N-glycidyl) compounds also include, however, triglycidyl isocyanurate, N,N'-diglycidyl derivatives of cycloalkyleneureas, such as ehyleneurea and 1,3-propyleneurea, and diglycidyl derivatives of hydantoins, for example of 5,5-dimethylhydantoin.

IV) Poly(S-glycidyl) compounds, for example di-S-glycidyl derivatives which derive from dithiols, for example 1,2-ethanedithiol or bis(4-mercaptomethylphenyl) ether.

V) Cycloaliphatic epoxy resins, for example bis(2,3-epoxycyclopentyl) ether, 2,3-epoxycyclopentylglydidyl ether, 1,2-bis(2,3-epoxycyciopentyloxy)ethane and 3,4-epoxycyclohexylmethyl-3',4'-epoxycyclohexanecarboxylate.

VI) Mixtures of the above epoxy resins with epoxidized oils, for example epoxidized soya bean oil.

However, use may also be made of epoxy resins in which the 1,2-epoxy groups have been bonded to various hetero atoms or functional groups. Examples of these compounds include the N,N,O-triglycidyl derivative of 4-aminophenol, the glycidyl ether-glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

The epoxy resin preferably used in the curable mixtures according to the invention is a liquid or viscous polyglycidyl ether or polyglycidyl ester, in particular a liquid or viscous bisphenol diglycidyl ether.

The abovementioned epoxy compounds are known and are in some cases available commercially. It is also possible to use mixtures of epoxy resins. Any of the conventional hardeners for epoxies may be used, for example amines, carboxylic acids, carboxylic anhydrides or phenols. It is, furthermore, possible to use catalytic hardeners, for example imidazoles. Examples of such hardeners are described, for example, in H. Lee, K. Neville, Handbook of Epoxy Resins, McGraw Hill Book Company, 1982. The amount of the hardener used depends on the chemical nature of the hardener and on the desired properties of the curable mixture and of the cured product. The maximum amount may easily be determined by a person skilled in the art. The mixtures may be prepared in a conventional manner by mixing the components, using hand-stirring or with the aid of known mixing equipment, for example by means of stirrers, kneaders or rolls. Depending on the application the commonly used additives may be admixed with the mixtures, for example fillers, pigments, dyes, flow control agents or plasticizers.

Preference is given below to the use of the novel organophilic phyllosilicates in polyurethanes. Structural components for crosslinked polyurethanes are polyisocyanates, polyols and, if desired, polyamines, in each case having two or more of the appropriate functional groups per molecule.

Either aromatic or aliphatic, or also cycloaliphatic, polyisocyanates are suitable building blocks for polyurethane chemistry. Examples of frequently used polyisocyanates are 2,4- and 2,6-diisocyanatoluene (TDI) and their mixtures, in particular the mixture of 80% by weight of 2,4- and 20% by weight of 2,6-isomer; methylene 4,4'-, 2,4- and 2,2'-diisocyanates (MDI) and their mixtures, and industrial products which may comprise, besides the abovementioned simple products having two aromatic rings, products having more than one ring (polymeric MDIs); naphthalene 1,5-diisocyanate (NDI); 4,4',4"-triisocyanatotriphenylmethane and bis(3,5diisocyanato-2-methylphenyl)methane; hexamethylene-1,6-diisocyanate (HDI) and 1-isocyanato-3-(isocyanatomethyl)-3,5,5-trimethylcyclohexane (isophorone diisocyanate, IPDI). These basic types of polyisocyanate may also, if desired, have been modified by di- or trimerization with the formation of corresponding carbodiimides, uretdiones, biurets or allophanates.

Particularly preferred polyisocyanates are the various methylene diisocyanates, hexamethylene diisocyanate and isophorone diisocyanate.

The polyols used in polyurethane preparation are either low-molecular-weight compounds or else oligomeric or polymeric polyhydroxy compounds. Examples of suitable low-molecular-weight polyols are glycols, glycerol, butanediol, trimethylolpropane, erythritol, pentaerythritol; pentitols, such as arabitol, adonitol or xylitol, hexitols, such as sorbitol, mannitol and dulcitol, the various types of sugar, for example sucrose, and also sugar derivatives and starch derivatives. Low-molecular-weight reaction products of polyhydroxy compounds, for example of those mentioned, with ethylene oxide and/or with propylene oxide are also frequently used as polyurethane components, as are the low-molecular-weight reaction products of other compounds which contain a sufficient number of groups capable of reacting with ethylene oxide and/or with propylene oxide, for example the appropriate reaction products of amines, for example in particular ammonia, ethylenediamine, 1,4-diaminobenzene, 2,4-diaminotoluene, 2,4'-diaminodiphenylmethane, 4,4'-diaminodiphenylmethane, 1-methyl-3,5-diethyl-2,4diaminobenzene and/or 1-methyl-3,5diethyl-2,6-diaminobenzene. Other suitable polyamines are listed in EP-A-0 265 781.

The long-chain polyol components used are mainly polyester polyols, including polylactones, for example polycaprolactones, and polyether polyols.

The polyester polyols are generally linear hydroxylpolyesters with molecular weights of from about 1000 to 3000, preferably up to 2000.

Suitable polyether polyols preferably have a molecular weight of from about 300 to 8000 (polyalkylene glycols) and may be obtained, for example, by reacting a starter with alkylene oxides, for example with ethylene, propylene or butylene oxides, or tetrahydrofuran. Examples of starters used here are water, aliphatic, cycloaliphatic or aromatic polyhydroxyl compounds mostly having 2, 3 or 4 hydroxyl groups, for example ethylene glycol, propylene glycol, butanediols, hexanediols, octanediols, dihydroxybenzenes or bisphenols, for example bisphenol A, trimethylolpropane or glycerol, or amines (see Ullmanns Encyclopadie der technischen Chemie [Ullmann's Encyclopaedia of Indusrial Chemistry], 4th edn. Vol. 19, Verlag Chemie GmbH, Weinheim, Germany, 1980, pp. 31–38 and pp. 304, 305). Particularly preferred types of polyalkylene glycols are polyether polyols based on ethylene oxide and polyether polyols based on propylene oxide, and also appropriate ethylene/propylene oxide copolymers, where these may be either random or else block copolymers. The ratio of ethylene oxide to propylene oxide in these copolymers may vary within wide limits. For example, it is possible for only the terminal hydroxyl groups of the polyether polyols to have been reacted with ethylene oxide (end-capping). However, the content of ethylene oxide units in the polyether polyols may, for example, also be up to 75 or 80% by weight. It will frequently be advantageous for the polyether polyols at least to be end-capped with ethylene oxide. They then have terminal primary hydroxyl groups which are more reactive than the secondary hydroxyl groups deriving from the reaction with propylene oxide. Polytetrahydrofurans should also be highlighted, and, like the abovementioned polyalkylene glycols, are available commercially (trade name POLYMEG®, for example). Preparation and properties of such polytetrahydrofurans have been described in more detail, for example, in Ullmanns Encyclopadie der technischen Chemie [Ullmann's Encyclopaedia of Industrial Chemistry], 4th edn., Vol. 19, Verlag Chemie GmbH, Weinheim, Germany, 1980, pp. 297–299.

Polyether polyols which comprise dispersed solid organic fillers to some extent chemically bonded to the polyether, for example polymeric polyols and polyurea polyols are also suitable as a component of polyurethanes. As is known the polymeric polyols are polymeric dispersions which have been prepared by free-radical polymerization of suitable olefinic monomers, in particular acrylonitrile, styrene or mixtures of the two, in a polyether serving as a graft base. Polyurea polyols (polyurea polyethers) are dispersions of polyureas which are obtainable by reacting polyisocyanates with polyamines in the presence of polyether polyols, and in which there is likewise some degree of chemical linking of the polyurea material with the polyether polyols via the hydroxyl groups on the polyether chains. Polyols as mentioned in this section have been described in more detail, for example, in Becker/Braun "Kunststoffhandbuch" [Plastics Handbook], Vol. 7 (Polyurethanes), 2nd edn., Carl Hanser Verlag, Munich, Vienna (1983), pp. 76, 77.

Polyamines likewise have an important role as components for preparing polyurethanes, in particular since they have higher reactivity than comparable polyols. As with the polyols, the polyamines used may be either low-molecular-weight polyamines, e.g. aliphatic or aromatic di- or polyamines, or polymeric polyamines, e.g. poly(oxyalkylene)polyamines.

Suitable poly(oxyalkylene)polyamines, which are obtainable, for example, from polyether polyols as given in U.S. Pat. No. 3,267,050, preferably have molecular weight of from 1000 to 4000 and are also obtainable commercially, e.g. under the designation JEFFAMINE®, e.g. JEFFAMINE® D 2000, an amino-terminated polypropylene glycol of the general formula $H_2NCH(CH_3)CH_2—[OCH_2CH(CH_3)]_x—NH_2$, where x has an average value of 33, giving an overall molecular weight of about 2000; JEFFAMINE® D 2001 having the following formula $H_2NCH(CH_3)CH_2—[OCH_2CH(CH_3)]_a—[OCH_2CH_2]_b—[OCH_2CH(CH_3)]_c—NH_2$, where b has an average value of about 40.5 and a+c is about 2.5; JEFFAMINE® BUD 2000, a urea-terminated polypropylene ether of the formula $H_2N(CO)NH—CH(CH_3)CH_2—[OCH_2CH(CH_3)]_n—NH(CO)NH_2$, where n has an average value of about 33 giving a molecular weight of about 2075, or JEFFAMINE® T 3000, a glycerol-started poly(oxypropylene)triamine having a molecular weight of about 3000.

Mixtures of one or more polyols and/or one or more polyamines are frequently used for preparing polyurethanes, for example in EP-A-0 512 947, EP-A-0 581 739 and in the prior art cited in these documents.

The material compositions for preparing polyurethanes may, if desired, like the epoxy resin compositions, also comprise other conventional additives, for example catalysts, stabilizers, blowing agents, release agents, flame retardants, fillers and pigments, etc.

The novel organophilic phyllosilicates may be added either to the resin or else to the hardener. The novel organophilic phyllosilicates are preferably used in amounts of from 0.5 to 30 per cent by weight, preferably from 1 to 30 per cent by weight, based on the total weight of the matrix, i.e. on the total weight of resin and hardener, or, as appropriate, on the total weight of the thermosetting or thermoplastic matrix. As mentioned, the matrix may comprise fillers known per se. The total amount of organophilic phyllosilicate and filler, based on the total weight of the matrix, i.e. on the total weight of resin and hardener or, as appropriate, on the total weight of the thermosetting or thermoplastic matrix, is preferably not more than 70 per cent by weight Examples of preferred fillers, in particular for epoxy systems and polyurethanes, are powdered quartz, wollastonite and chalk.

The shapable, moulding compositions which comprise the novel phyllosilicates and, if desired, other additives, may be processed by conventional plastics processing methods, such as injection moulding or extrusion or other methods of shaping, to give finished mouldings, i.e. composite materials, in particular nanocomposites. Epoxy resins may be used as casting resins. The organophilic phyllosilicates described also have a wide variety of uses in coatings, in coating materials or adhesives, as flame retardants, as agents with thixotropic effect and/or as reinforcing agents.

The novel organophilic phyllosilicates may be used to prepare a wide variety of castable and crosslinkable compositions. For this, the organophilic phyllosilicates may be treated with a monomer or with a mixture of such monomers, whereupon the phyllosilicates swell due to penetration by these monomers. After swelling the compositions are polymerized. Examples of such monomers are acrylate monomers, methacrylate monomers, caprolactam, laurolactam, aminoundecanoic acid, aminocaproic acid and aminododecanoic acid. The resin component or the hardener component of an epoxy system, or the components of a polyurethane system, may likewise be monomers of this type.

EXAMPLE 1

(Synthesis of ricinyl-4,5-dihydro-1-H-imidazole from castor oil)

466.7 g (0.5 mol) of castor oil and 135.23 g (2.25 mol) of ethylenediamine are heated with reflux at 150° C. for 4 hours in a 2 liter three-necked flask provided with stirrer, high-performance condenser and distillation bridge with a 250 ml receiver flask, and then heated rapidly to 270° C., whereupon excess ethylenediamine and water distil off. The reaction is terminated after a reaction time of 24 hours. This gives 108 g of distillate and 475 g a yellow wax. The wax is slurried in toluene and filtered. The filtrate is concentrated on a rotary evaporator, whereupon the residue is 330 g of an orange-coloured wax, which is the product: ricinyl-4,5-dihydro-1-H-imidazole (RDI):

$^1$H NMR: δ(ppm): 6.6 (N-H,1), 5.5 (olefin,14a), 5.3 (olefin, 13a), 3.5 (OH, 17)

RDI:

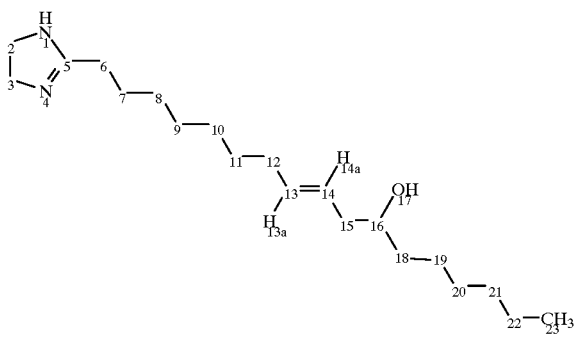

EXAMPLE 2
(Synthesis of ricinyl-4,5-dihydro-1-H-imidazole of ricinoleic acid)

358.16 g (1.2 mol) of castor oil and 180 g (3 mol) of ethylenediamine in an atmosphere of nitrogen are heated with reflux at 150° C. for 1 hour in a 2 liter three-necked flask provided with stirrer, high-performance condenser and distillation bridge with a 250 ml receiver flask, and then heated rapidly to 250° C., whereupon excess ethylenediamine and water distil off. The reaction is terminated after a reaction time of 24 hours. This gives 142 g of distillate and 367 g of a yellow wax. This yellow wax is worked up as described in Example 1, giving the same product.

EXAMPLE 3
(Synthesis of ricinyl-4,5-dihydro-1-H-imidazolium hydrochloride and of the three-layer silicate organophilically modified therewith)

154.6 g of the purified RDI are heated in 4 liters of deionized water in a glass beaker and mixed, with stirring, with 48 ml of concentrated hydrochloric acid. 200 g of the synthetic three-layer silicate Somasif ME 100 from CO-OP Chemicals, Japan, are then added, with stirring, to this hot solution, whereupon a cream-coloured precipitate flocculates out. This precipitate is filtered off and washed with a total of 12 liters of hot deionized water in such a way that no further chloride can be detected with 0.1 N silver nitrate solution. The three-layer silicate modified in this way is dried in vacuo at 80° C. for 72 hours. The product is termed Somasif RDI below.

Thermogravimetric studies give 60 meq/100 g for the degree of loading. Somasif ME 100 has a cation exchange capacity of from 70–80 meq/100 g. X-Ray studies reveal that the distance between the layers in the three-layer silicate has been extended from 0.94 to 2.6 nm.

EXAMPLE 4
(Synthesis of the epoxy resin nanocomposite filled with Somasif RDI and production of the mouldings)

Figure 1:
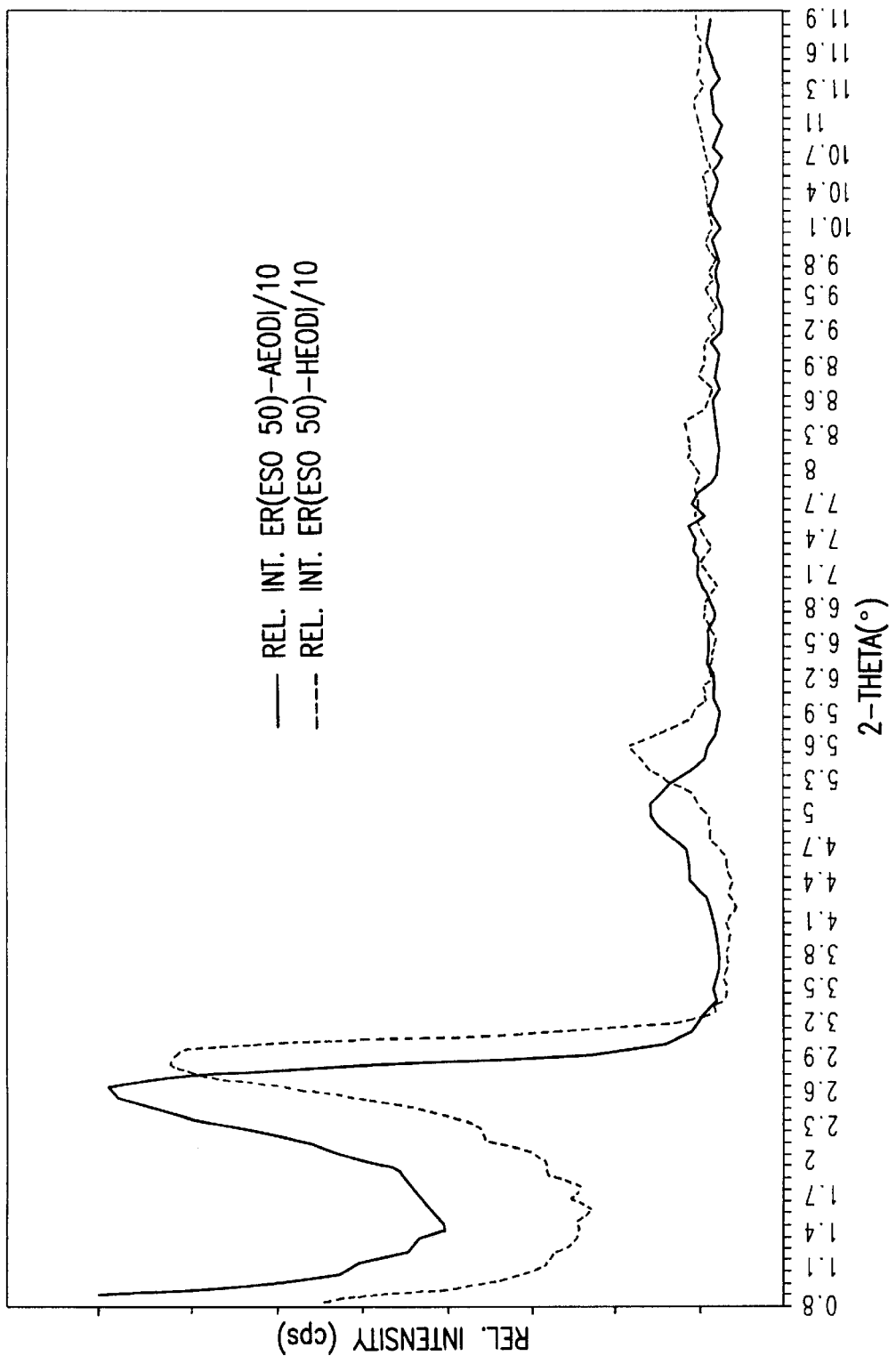
FIG. 1 shows a WAXS (wide-angle X-ray) image of Somasif ME 100 (unmodified).
Figure 2:
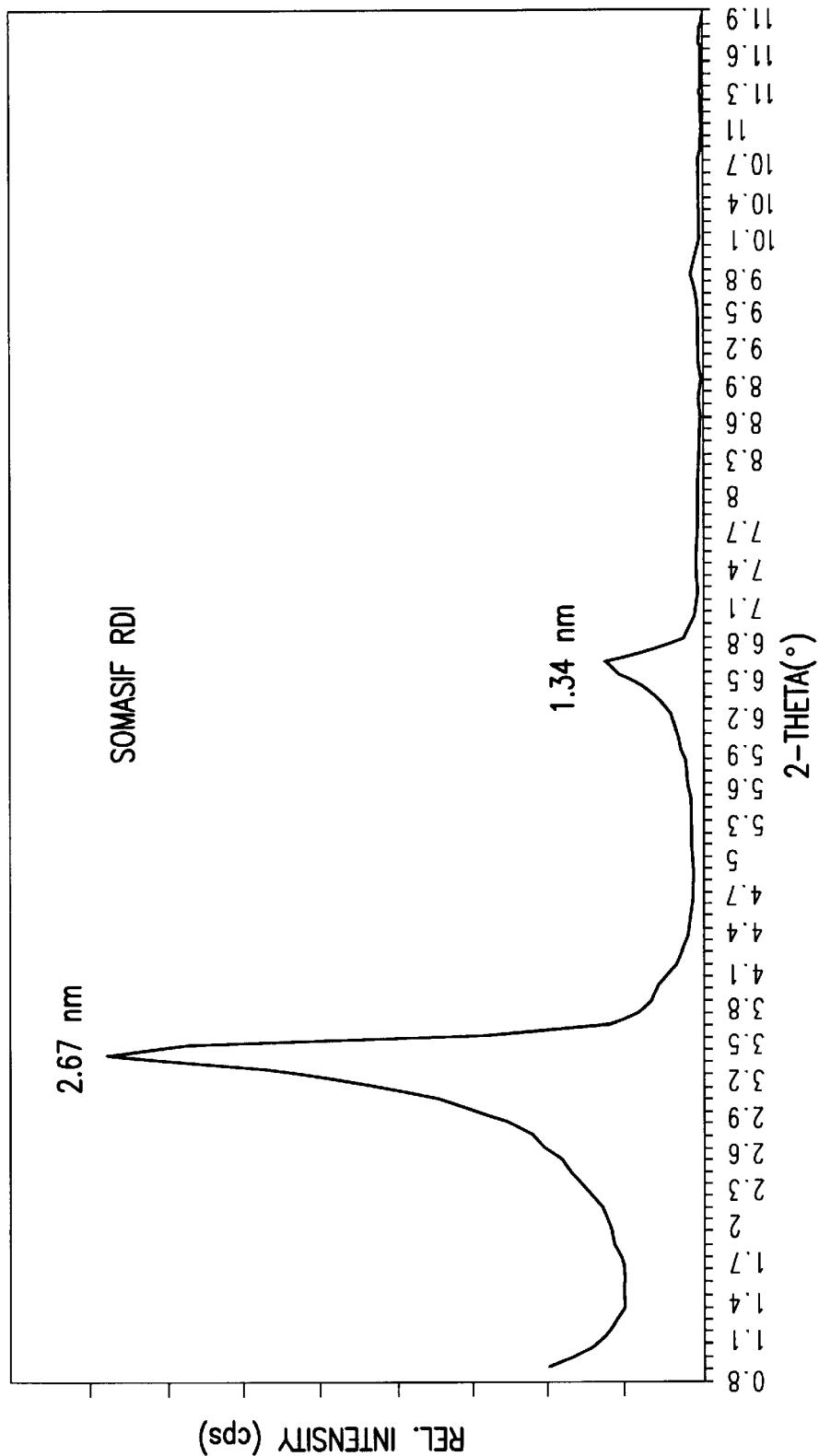
FIG. 2 shows a WAXS (wide-angle X-ray) image of Somasif RDI (unmodified).
Figure 3:
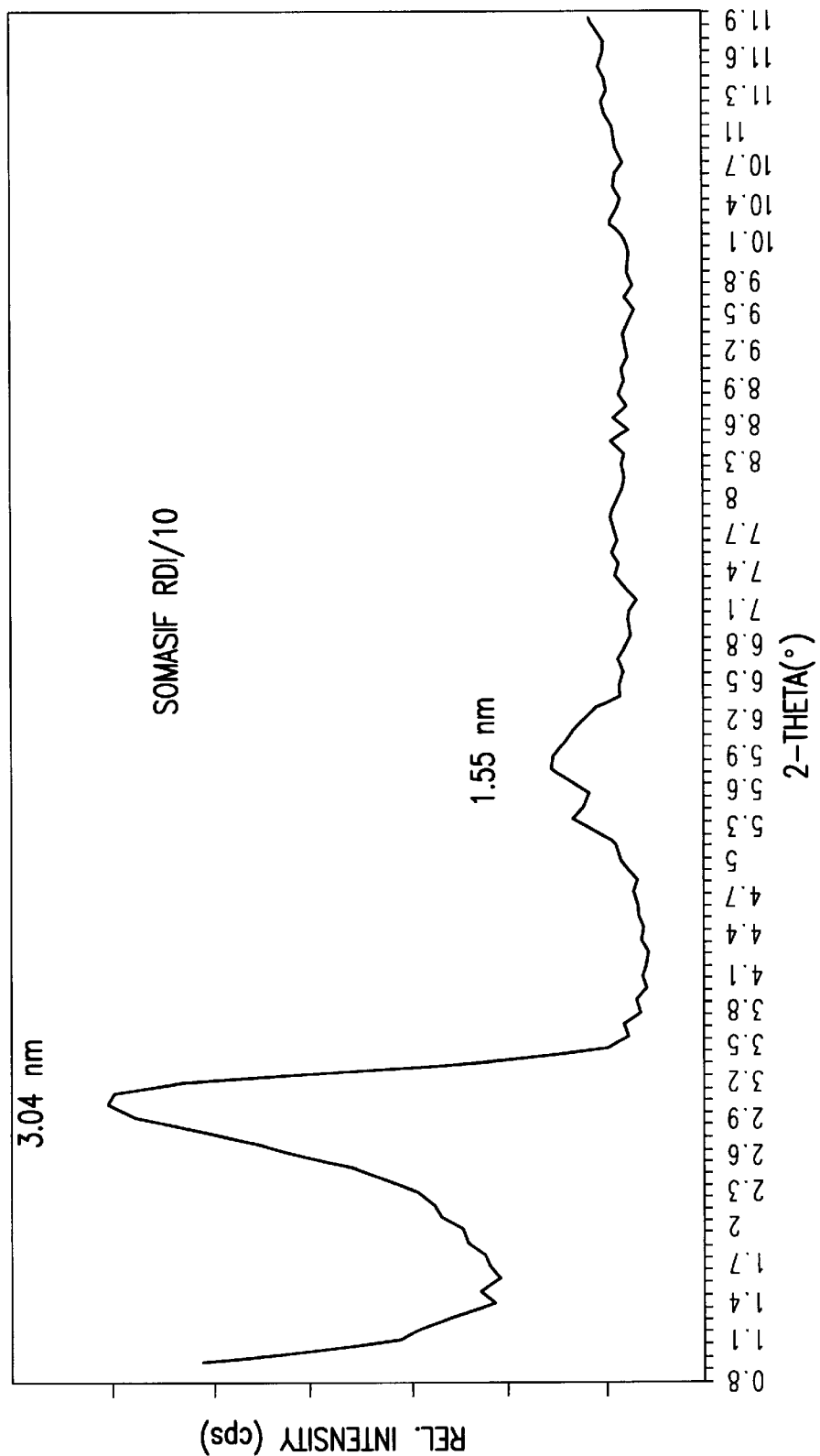

To prepare the nanocomposites the mixture always used is Araldit CY225® (epoxy component) and Araldit HY925® (anhydride hardener) in a weight ratio of 100:80. This mixture is then modified with, respectively, 2.5; 5; 7.5 and 10% by weight of the filler prepared in Example 3. An example of the production of the mouldings will now be given below, using the example of the 10% by weight nanocomposite:

300 g of Araldit CY225® and 60 g of Somasif RDI in a metal container are stirred for 1 hour at 80° C./13 mbar in a planetary mixer, followed by addition of 240 g of Araldit HY925®. This reaction mixture is pregelled at 80° C./13 mbar to a viscosity of about 20,000 mPas, with stirring and then, to produce mouldings, charged to steel moulds of dimensions 200×200×4 mm and cured to completion for 14 hours at 140° C. Incorporation into the epoxy matrix further extends the distance between the layers in the three-layer silicate from 2.6 nm (Somasif RDI) to 3 nm:

FIG. 3 shows a WAXS (wide-angle X-ray) image of the 10% by weight nanocomposite Somasif RDI/10.

Test specimens are then cut from the cast mouldings and are then subjected in accordance with ISO 527/95 to a tensile test, and also to a bend-notch test in accordance with PM/258/90. The resultant mechanical properties are given in Table 1 below and compared with those of an unmodified sample:

TABLE 1

| Sample | Content of Somasif RDI | Modulus (MPa) | Tensile strength (N/mm$^2$) | Elongation at break (%) | K1$_c$ (MPa · m$^{1/2}$) | G1$_c$ (J/m$^2$) |
|---|---|---|---|---|---|---|
| CY225 | 0 | 3390 | 81.0 | 8.2 | 0.67 | 158 |
| Somasif RDI/2.5 | 2.5 | 3340 | 68.3 | 2.4 | 0.91 | 295 |
| Somasif RDI/5 | 5 | 3440 | 66.4 | 2.4 | 0.92 | 292 |
| Somasif RDI/7.5 | 7.5 | 3550 | 63.5 | 2.3 | 0.93 | 290 |
| Somasif RDI/10 | 10 | 3670 | 61.6 | 2.0 | 0.96 | 299 |

It can be seen clearly that the epoxy matrix is reinforced by incorporating the filler Somasif RDI. The toughness of the resultant material is also increased, even by slight modification, but does not increase significantly as filler content rises.

Figure 4:
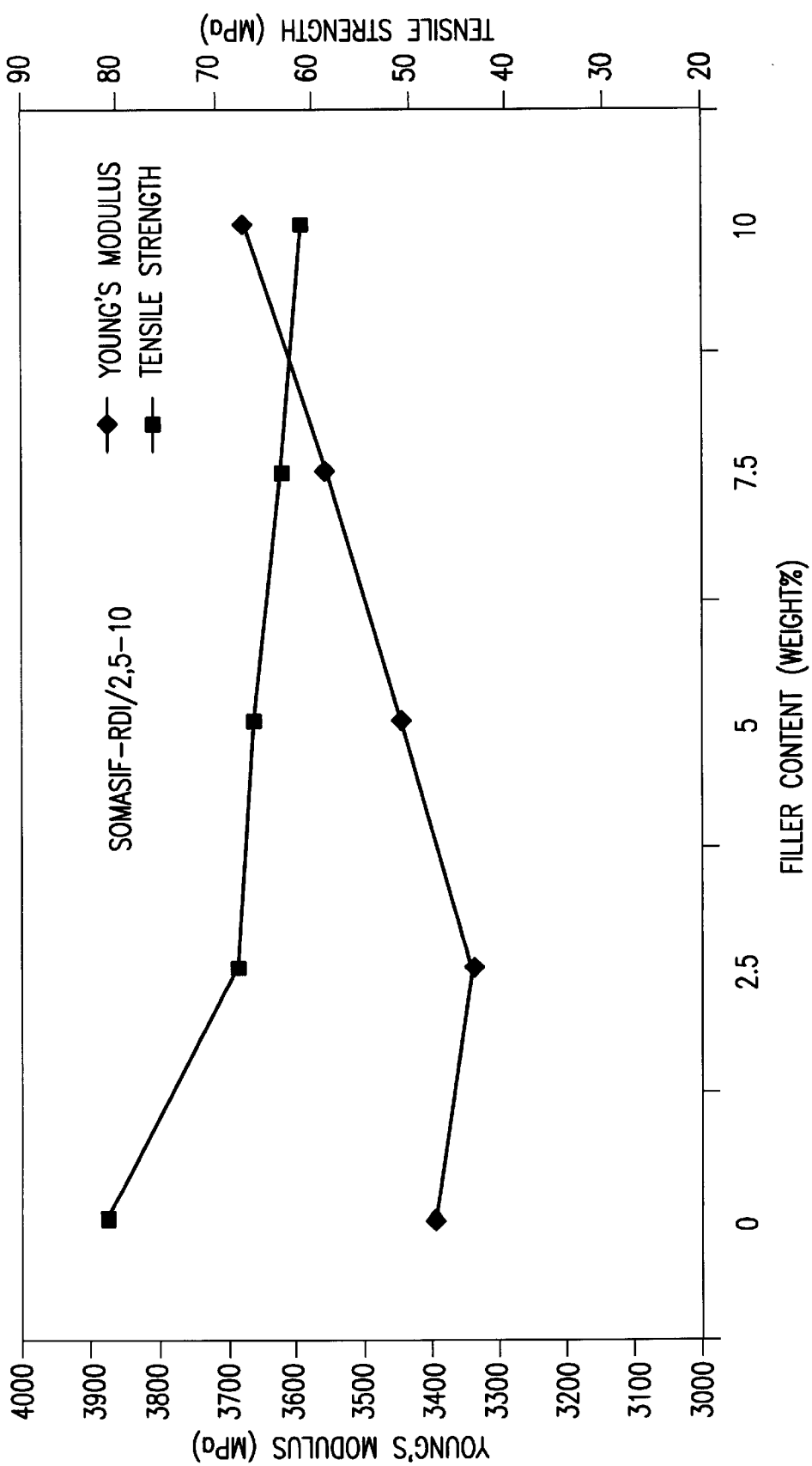

FIG. 4 shows the moduli of elasticity and the tensile strengths of the nanocomposites Somasif RDI/2.5–10, and also of the unmodified moulded material.

Figure 5:
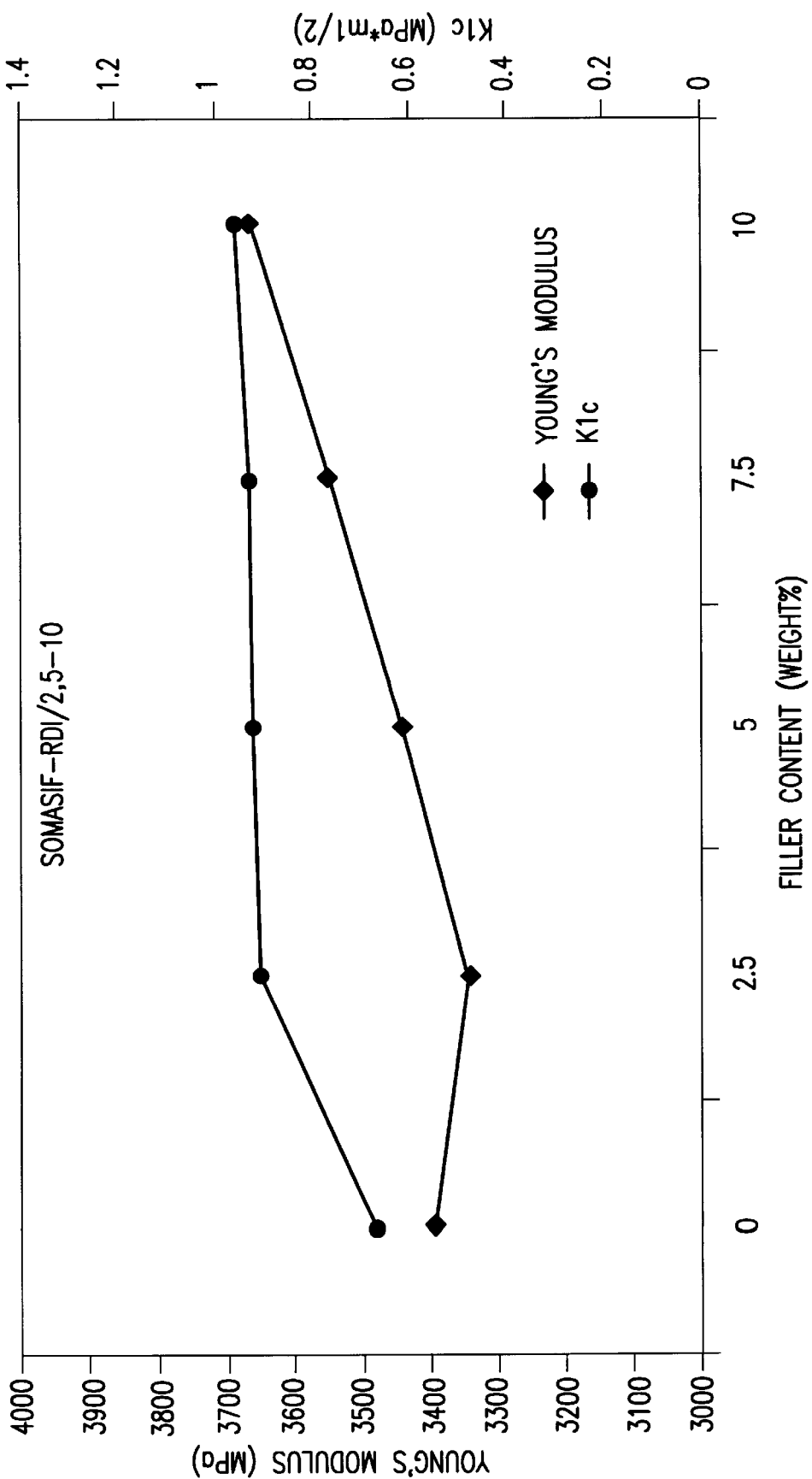

FIG. 5 shows the moduli of elasticity and the critical stress intensity factors (K1$_c$) of the nanocomposites Somasif RDI/2.5–10, and also of the unmodified moulded material.

EXAMPLE 5
(Synthesis of a hydroxyethyloleyl-4,5-dihydro-1-H-imidazolinium hydrochloride and of the three-layer silicate organophilically modified therewith)

168.3 g of the hydroxyethyloleyl-4,5-dihydro-1-H-imidazoline (Servamine KOO 360 from Hüls AG, Germany) are heated in 4 liters of deionized water in a glass beaker and mixed, with stirring, with 48 ml of concentrated hydrochloric acid. 200 g of the synthetic three-layer silicate Somasif ME 100 from CO-OP Chemicals, Japan, are then added, with stirring, to this hot solution, whereupon a cream-coloured precipitate flocculates out. This precipitate is filtered off and washed with a total of 12 liters of hot deionized water, in such a way that no further chloride can be detected with 0.1 N silver nitrate solution. The three-layer silicated modified in this way is dried in vacuo at 80° C. for 72 hours. The product is termed Somasif HEODI below.

Thermogravimetric studies give 61 meq/100 g for the degree of loading. Somasif ME 100 has a cation exchange capacity of from 70–80 meq/100 g. X-Ray studies reveal that the distance between the layers of the three-layer silicate has been extended from 0.94 nm to 3.3 nm.

Figure 6:
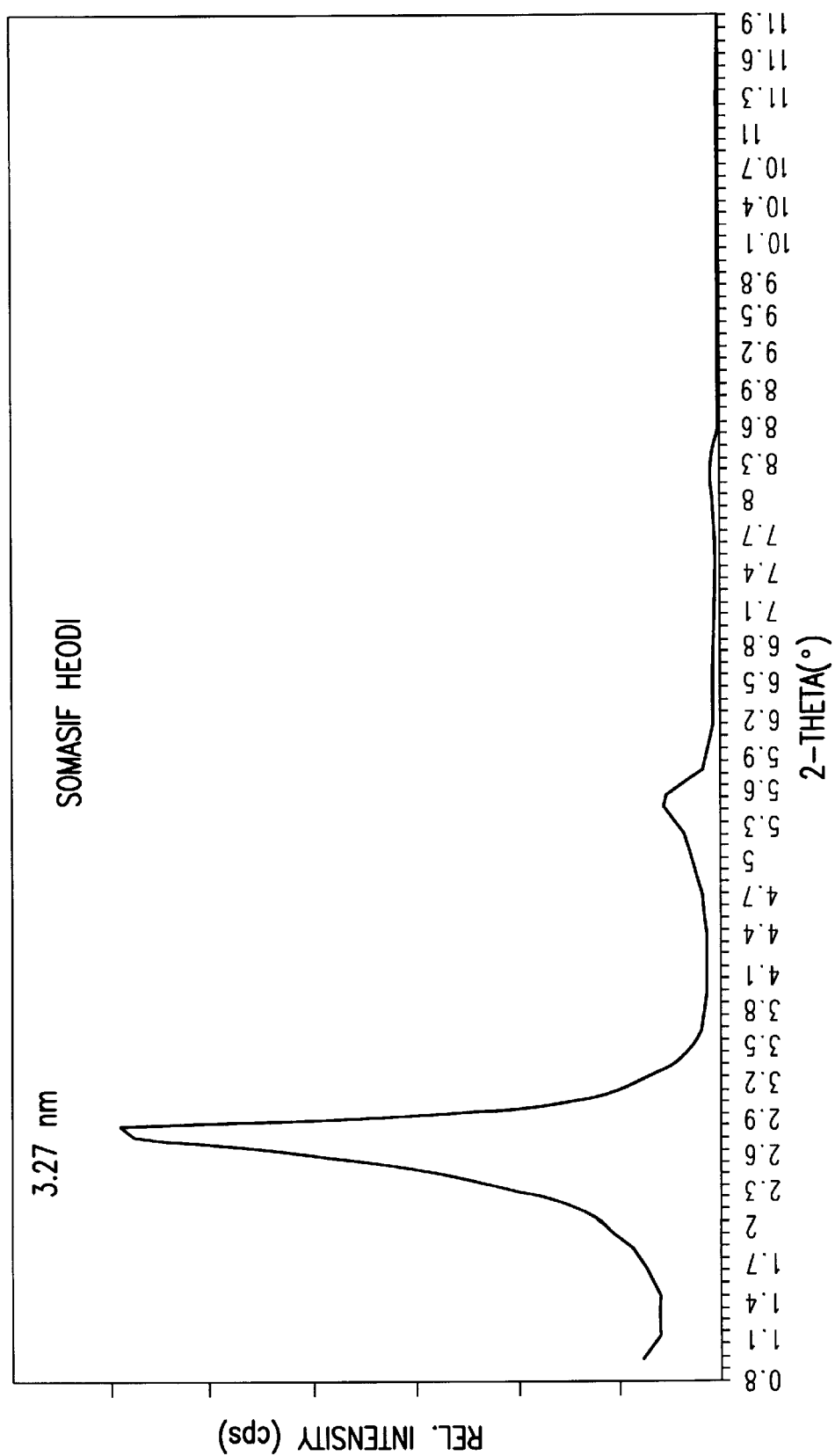

FIG. 6 shows a WAXS (wide-angle X-ray) image of Somasif HEODI (modified).

EXAMPLE 6
(Synthesis of the epoxy resin nanocomposites filled with Somasif HEODI and production of the mouldings)

The nanocomposites are prepared in a manner analogous to that of Example 4 except that in this case Somasif HEODI is used.

Figure 7:
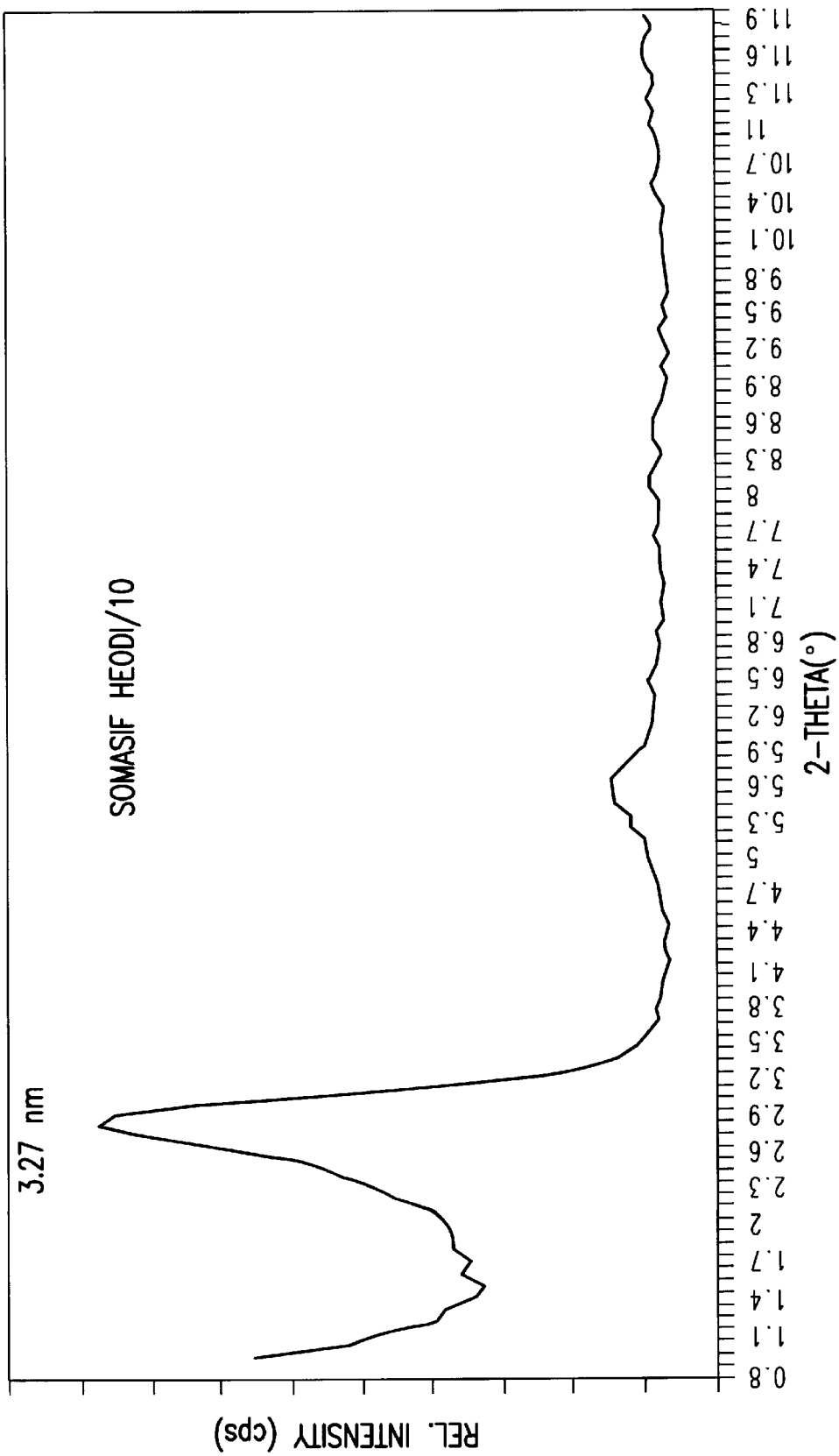

FIG. 7 shows a WAXS (wide-angle X-ray) image of the 10% by weight nanocomposite Somasif HEODI/10.

Once again, test specimens are cut from the mouldings which had been cast, and studied. The mechanical properties are given in Table 2 below and compared with those of an unmodified sample:

TABLE 2

| Sample | Content of Somasif HEODI | Modulus (MPa) | Tensile strength (N/mm$^2$) | K1$_c$ (MPa · m$^{1/2}$) | G1$_c$ (J/m$^2$) |
|---|---|---|---|---|---|
| CY225 | 0 | 3390 | 81.0 | 0.67 | 158 |
| Somasif HEODI/2.5 | 2.5 | 3230 | 70 | 0.92 | 220 |
| Somasif HEODI/5 | 5 | 3280 | 67 | 0.92 | 220 |
| Somasif HEODI/7.5 | 7.5 | 3360 | 62 | 0.95 | 230 |
| Somasif HEODI/10 | 10 | 3460 | 58 | 0.99 | 240 |

Figure 8:
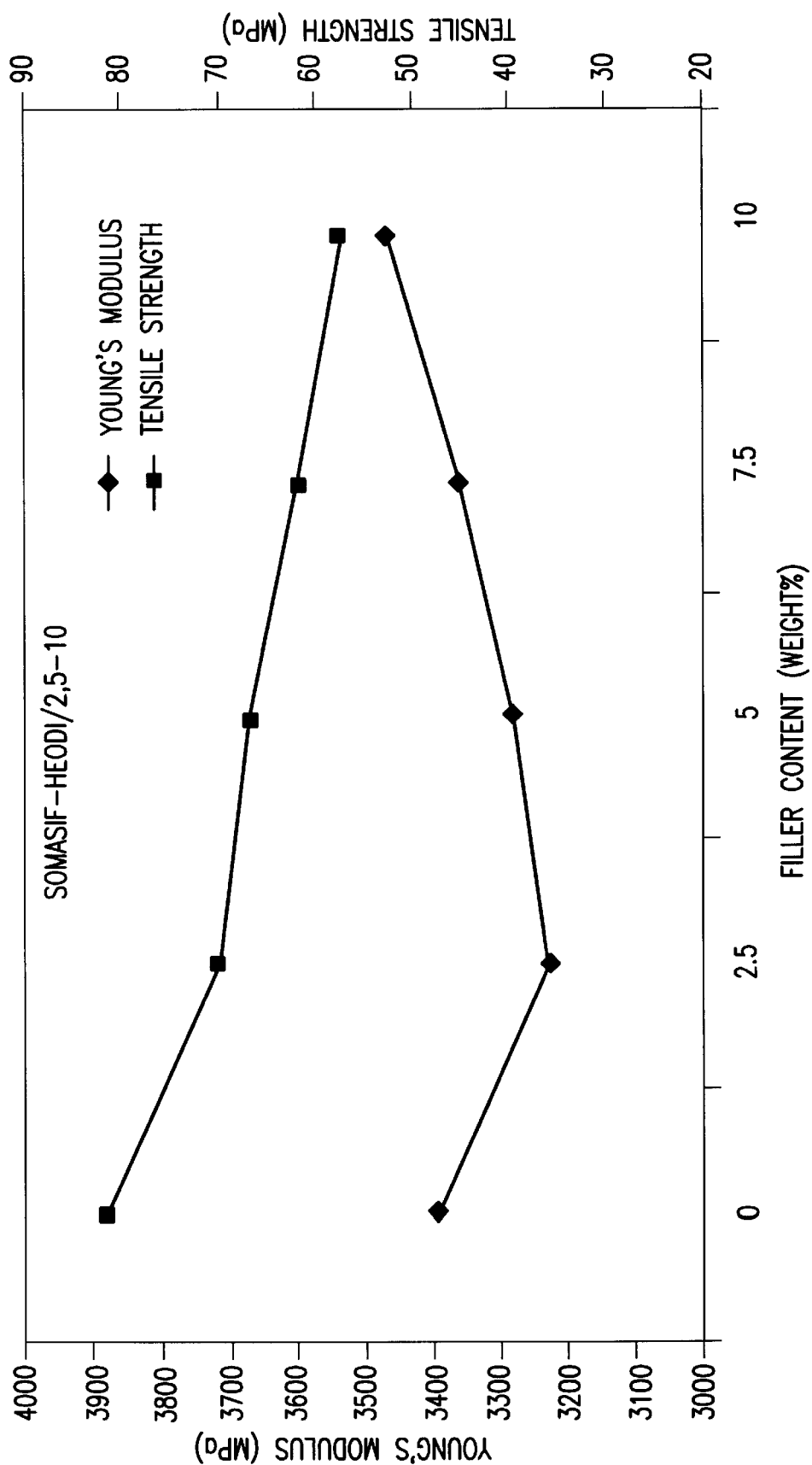

FIG. 8 shows the moduli of elasticity and the tensile strengths of the nanocomposites Somasif HEODI/2.5–10, and also of the unmodified moulded material.

Figure 9:
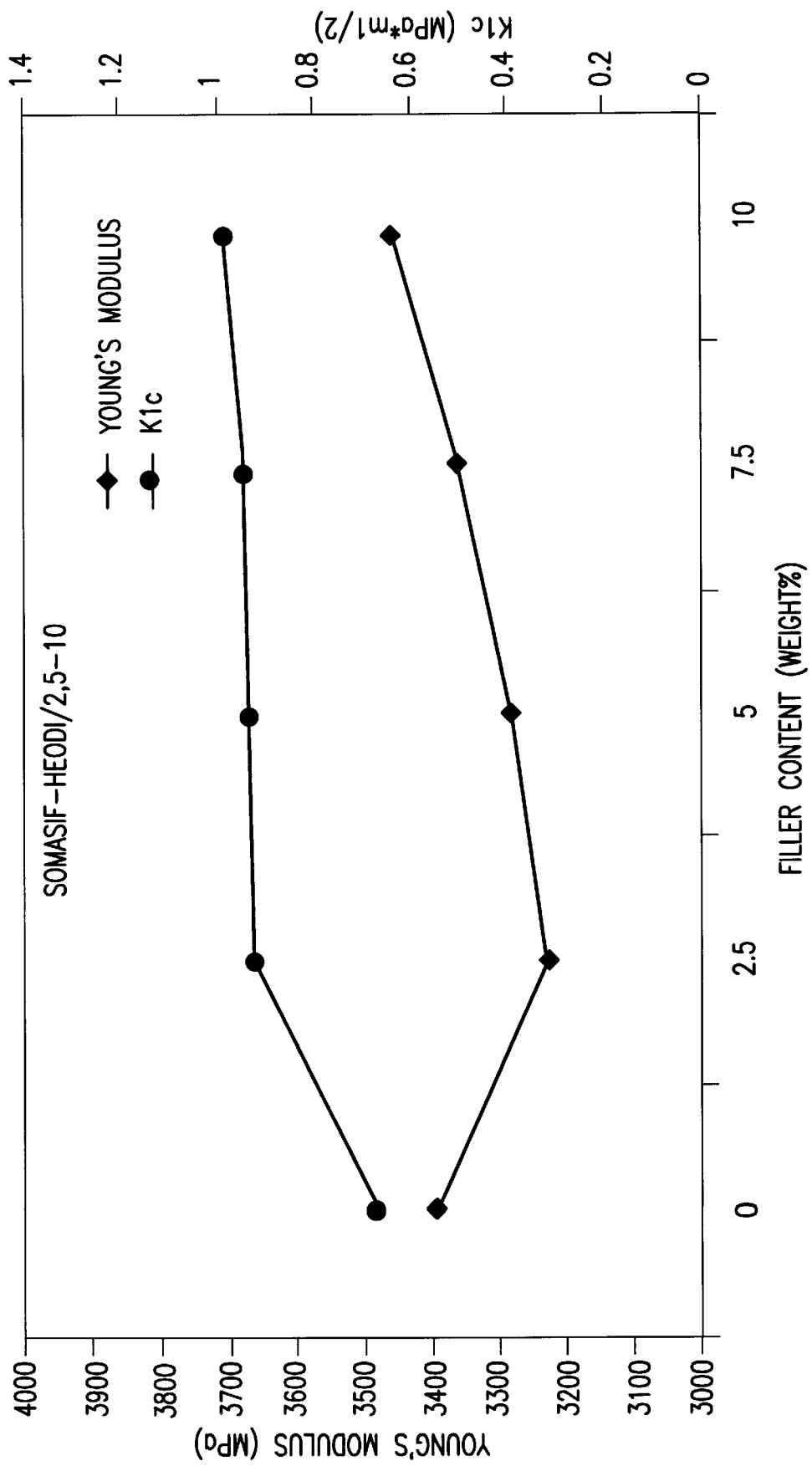

FIG. 9 shows the moduli of elasticity and the critical stress intensity factors (K1$_c$) of the nanocomposites Somasif HEODI/2.5–10, and also of the unmodified moulded material.

EXAMPLE 7
(Synthesis of an aminoethyloleyl-4,5-dihydro-1-H-imidazolinium hydrochloride and of the three-layer silicate organophilically modified therewith)

167.8 g of the aminoethyloleyl-4,5-dihydro-1-H-imidazoline (Servamine KOO 330 from Hüls AG, Germany) are heated in 4 liters of deionized water in a glass beaker and mixed, with stirring, with 48 ml of concentrated hydrochloric acid. 200 g of the synthetic three-layer silicate Somasif ME 100 from CO-OP Chemicals, Japan, are added, with stirring, to this hot solution, whereupon a cream-coloured precipitate flocculates out. This precipitate is filtered off and washed with a total of 12 liters of hot deionized water, in such a way that no further chloride can be detected with 0.1 N silver nitrate solution. The three-layer silicate modified in this way is dried in vacuo for 72 hours at 80° C. The product is termed Somasif AEODI below.

Thermogravimetric studies give 61 meq/100 g for the degree of loading. Somasif ME 100 has a cation exchange capacity of from 70–80 meq/100 g. X-Ray studies reveal that the distance between the layers of the three-layer silicate has been extended from 0.94 nm to 3.3 nm.

Figure 10:
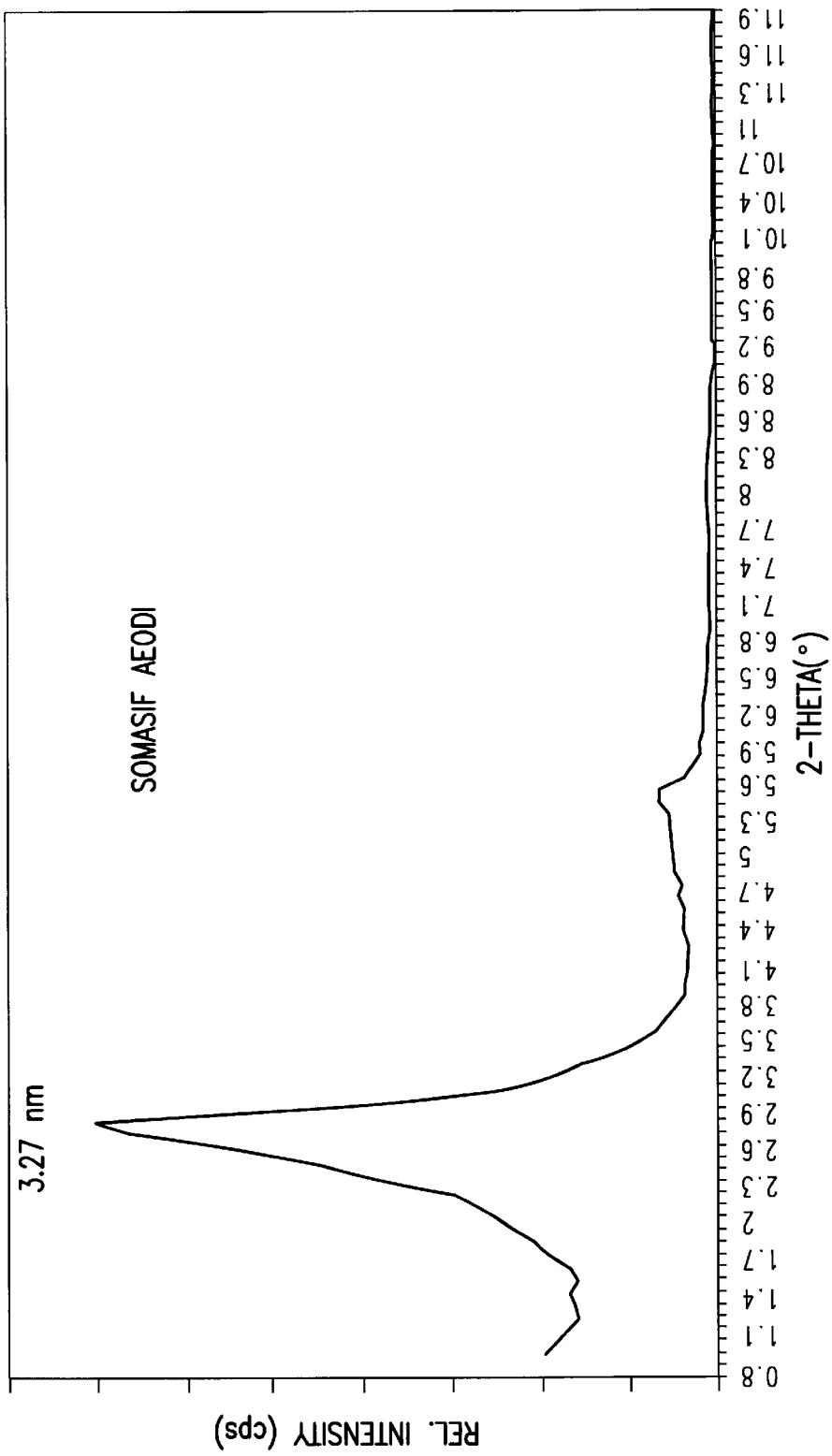

FIG. 10 shows a WAXS (wide-angle X-ray) image of Somasif AEODI (modified).

EXAMPLE 8
(Synthesis of the epoxy resin nanocomposites filled with Somasif AEODI and production of the mouldings)

The nanocomposites are prepared in a manner analogous to that of Example 4 except that Somasif AEODI is used here.

Figure 11:
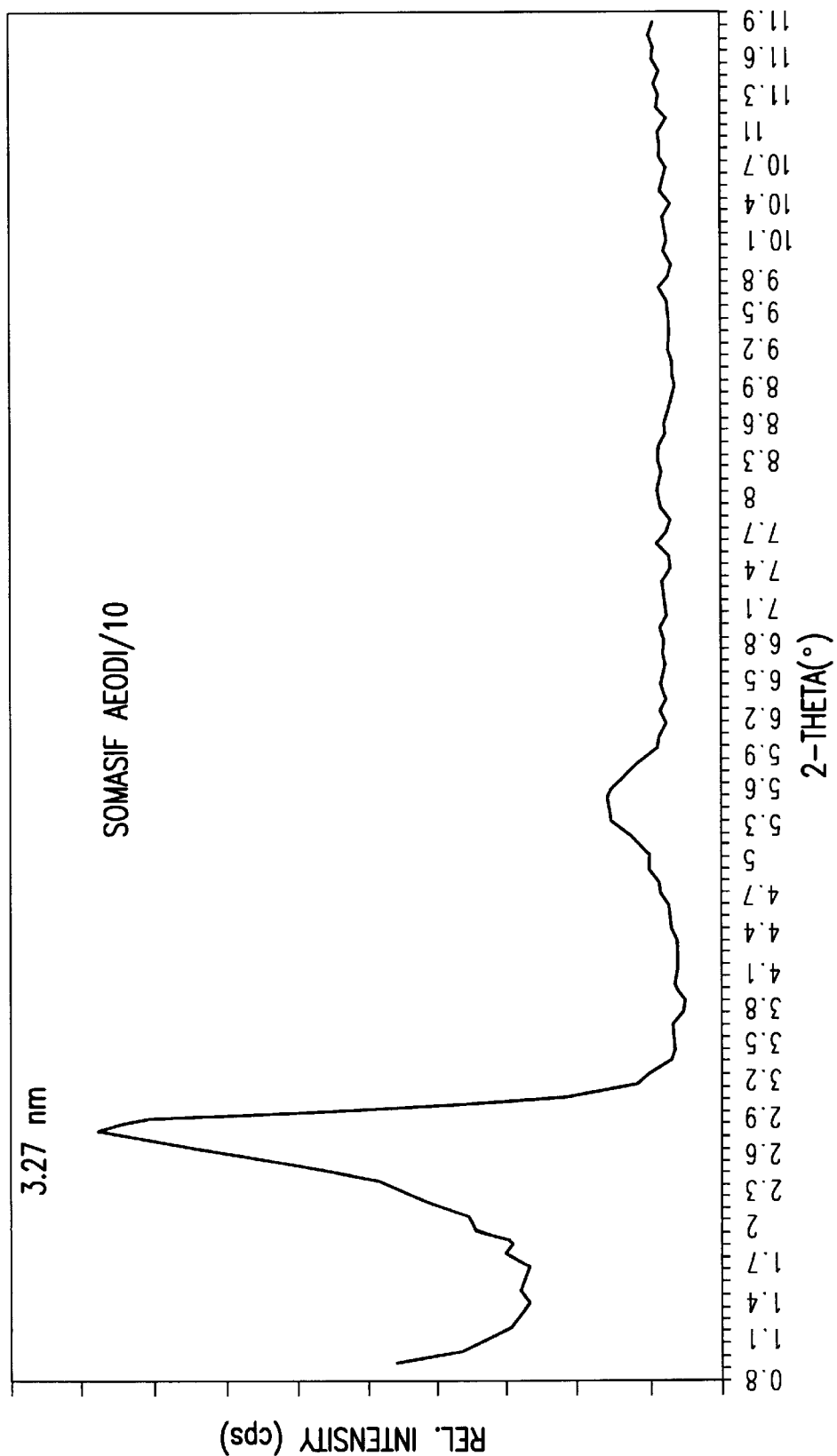

FIG. 11 shows a WAXS (wide-angle X-ray) image of the 10% by weight nanocomposite Somasif AEODI/10.

Once again, test specimens are cut from the cast mouldings and studied. The mechanical properties are given in Table 3 below and compared with those of an unmodified sample:

TABLE 3

| Sample | Content of Somasif AEODI | Modulus (MPa) | Tensile strength (N/mm$^2$) | K1$_c$ (MPa · m$^{1/2}$) | G1$_c$ (J/m$^2$) |
|---|---|---|---|---|---|
| CY225 | 0 | 3390 | 81.0 | 0.67 | 158 |
| Somasif AEODI/2.5 | 2.5 | 3300 | 67 | 0.91 | 210 |
| Somasif AEODI/5 | 5 | 3350 | 60 | 0.99 | 240 |
| Somasif AEODI/7.5 | 7.5 | 3420 | 61 | 0.98 | 240 |
| Somasif AEODI/10 | 10 | 3470 | 56 | 1.07 | 280 |

Figure 12:
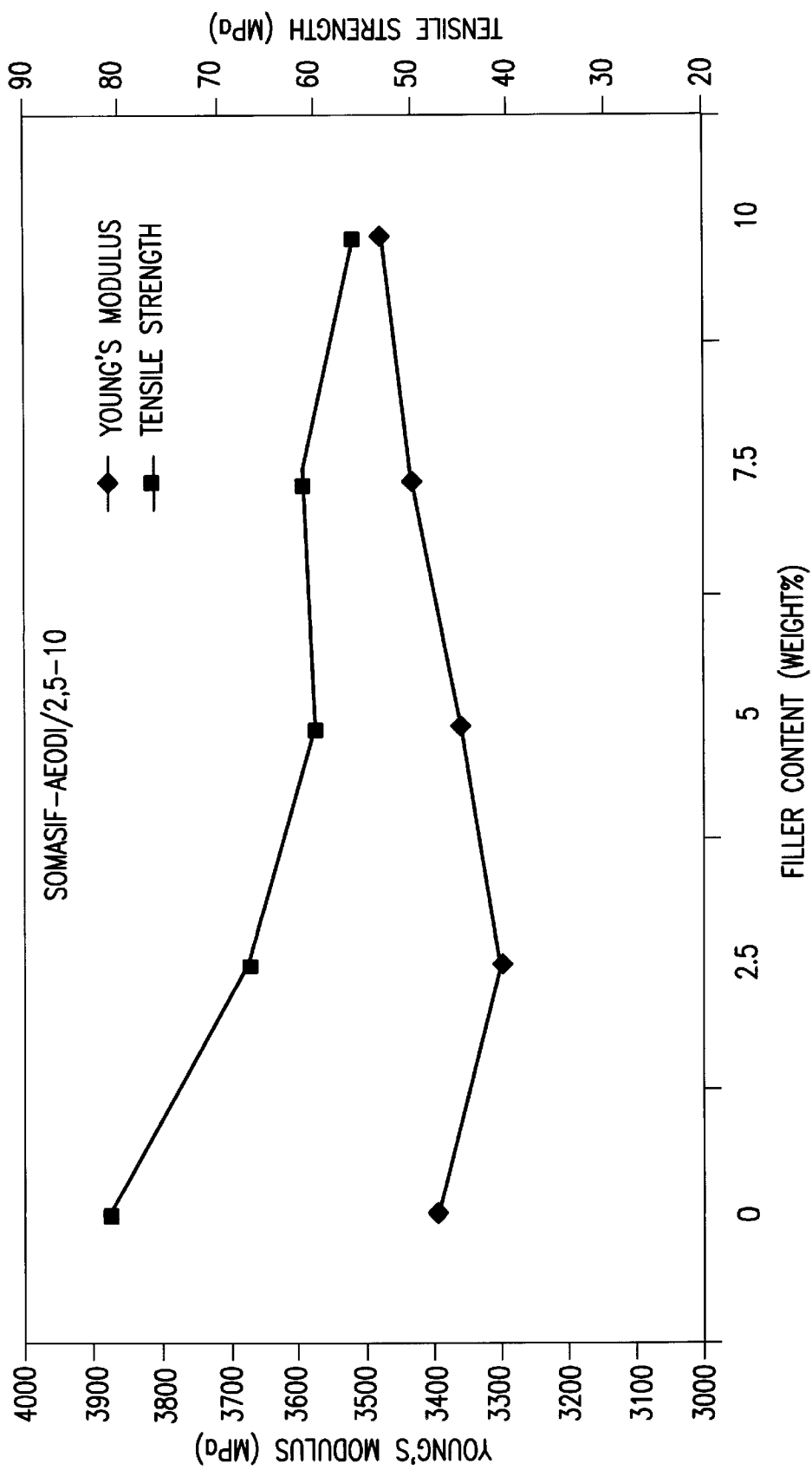

FIG. 12 shows the moduli of elasticity and the tensile strengths of the nanocomposites Somasif AEODI/2.5–10, and also of the unmodified moulded material.

Figure 13:
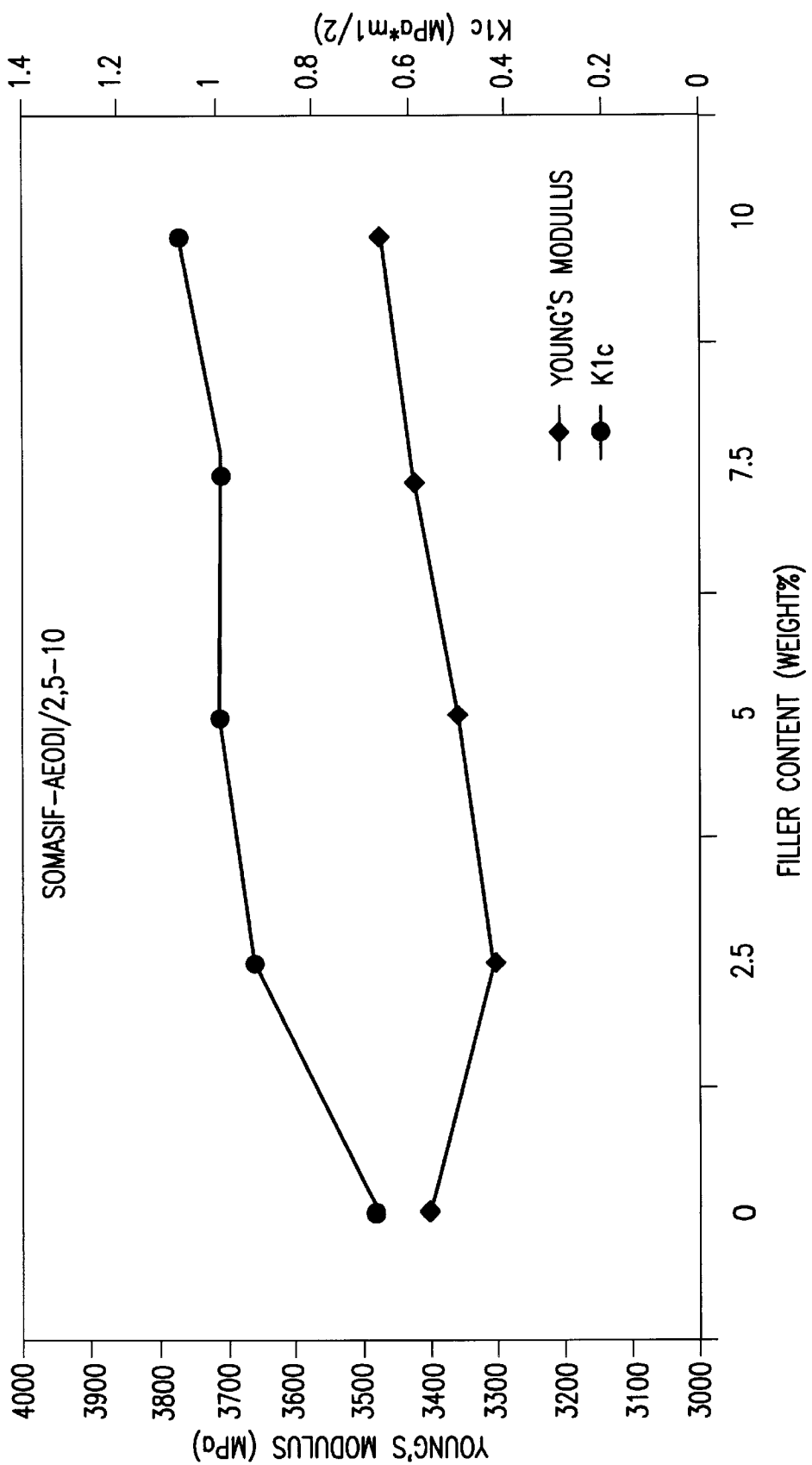

FIG. 13 shows the moduli of elasticity and the critical stress intensity factors (K1$_c$) of the nanocomposites Somasif AEODI/2.5–10, and also of the unmodified moulded material.

EXAMPLE 9
(Synthesis of a three-layer silicate organophilically modified with 1-methyl-2-nortallowalkyl-3-tallow-fatty acid amidoethylimidazolinium methosulfate)

357.7 g of 1-methyl-2-nortallowalkyl-3-tallow-fatty-acid-amidoethylimidazolinium methosulfate (Rewoquat W75 from Witco Surfacants GmbH, Germany) are heated in 4 liters of deionized water in a glass beaker and mixed, with stirring with 48 ml of concentrated hydrochloric acid. 200 g of the synthetic three-layer silicate Somasif ME 100 from CO-OP Chemicals, Japan, are then added, with stirring, to this hot solution, whereupon a cream-coloured precipitate flocculates out. This precipitate is filtered off and washed with a total of 12 liters of hot deionized water, in such a way that no further chloride can be detected with 0.1 N silver nitrate solution. The three-layer silicate modified in this way is dried in vacuo at 80° C. for 72 hours. The product is termed Somasif W75 below.

Thermogravimetric studies give 60 meq/100 g for the degree of loading. Somasif ME 100 has a cation exchange capacity of from 70–80 meq/100 g. X-Ray studies reveal that the distance between the layers of the three-layer silicate has been extended from 0.94 nm to 4.0 nm.

Figure 14:
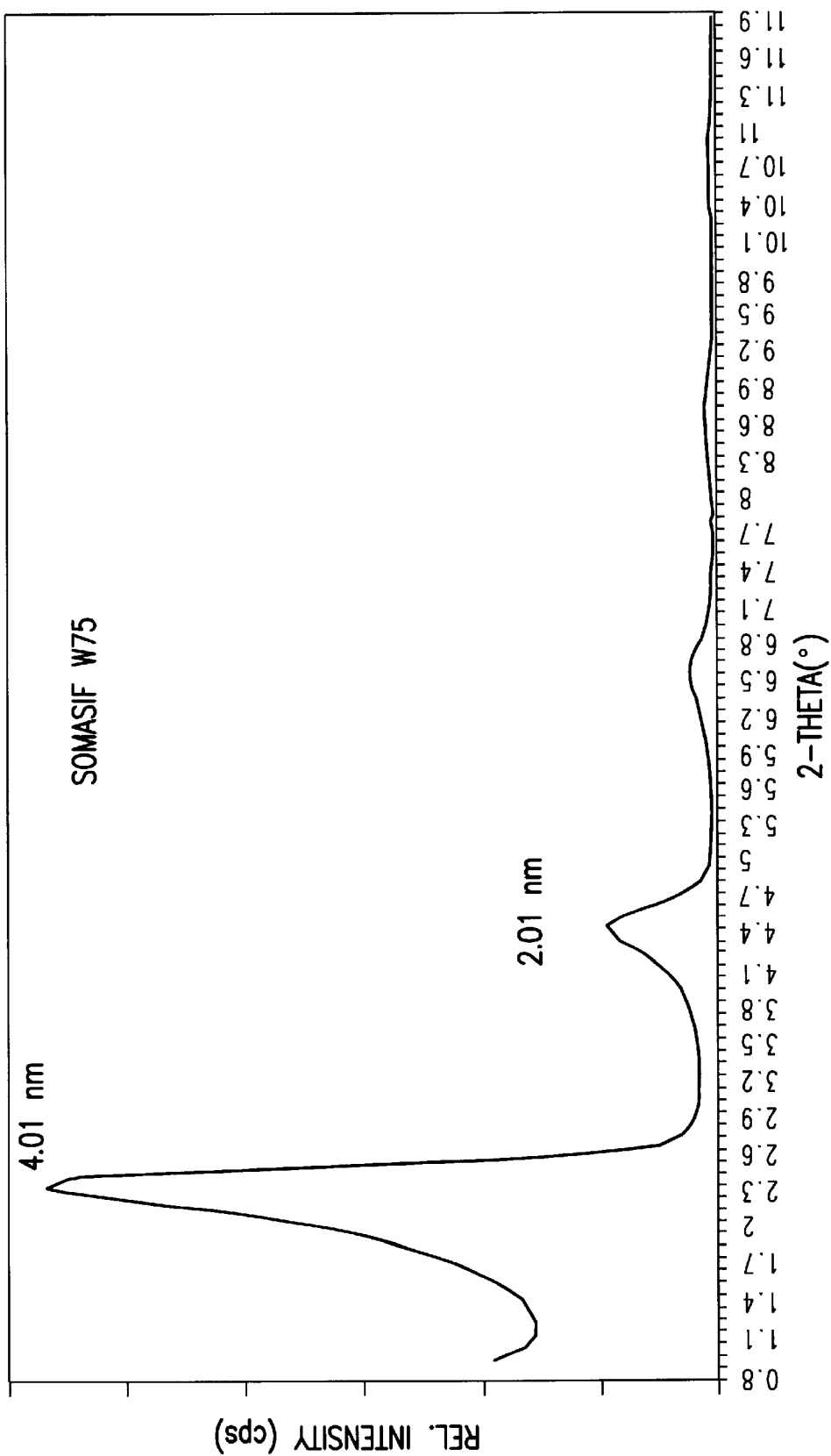

FIG. 14 shows a WAXS (wide-angle X-ray) image of Somasif W75 (modified).

EXAMPLE 10
(Synthesis of the epoxy resin nanocomposites filled with Somasif W75 and production of the mouldings)

The nanocomposites are prepared in a manner analogous to that of Example 4 except that Somasif W75 is used here.

Figure 15:
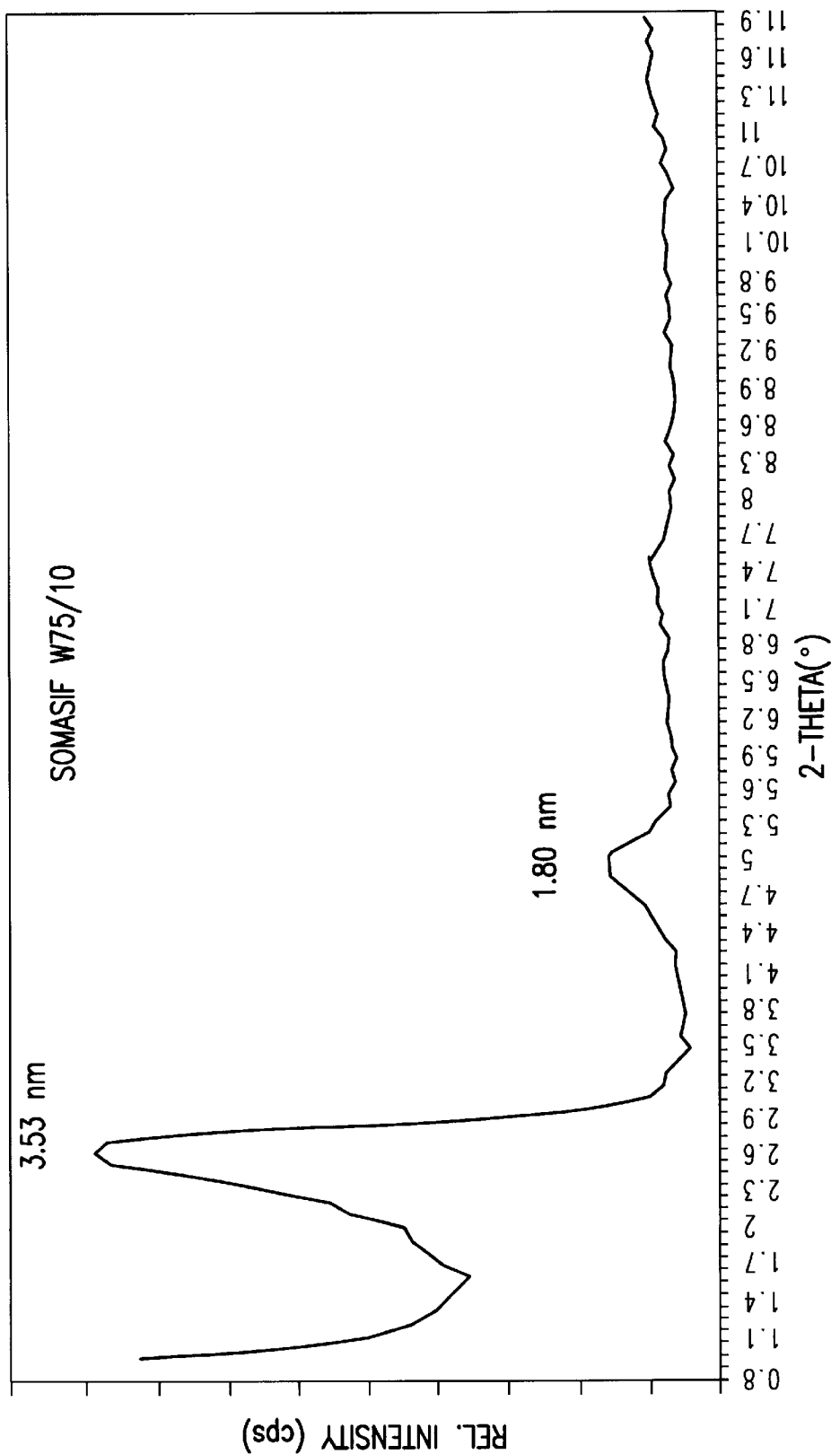

FIG. 15 shows a WAXS (wide-angle X-ray) image of the 10% by weight nanocomposite Somasif W75/10.

Once again, test specimens are cut from the cast mouldings and studied. The mechanical properties are given in Table 4 below and compared with those of an unmodified sample:

TABLE 4

| Sample | Content of Somasif W75 | Modulus (MPa) | Tensile strength (N/mm$^2$) | K1$_c$ (MPa·m$^{1/2}$) | G1$_c$ (J/m$^2$) |
|---|---|---|---|---|---|
| CY225 | 0 | 3390 | 81.0 | 0.67 | 158 |
| Somasif W75/2.5 | 2.5 | 3190 | 76 | 0.89 | 210 |
| Somasif W75/5 | 5 | 3180 | 67 | 0.96 | 240 |
| Somasif W75/7.5 | 7.5 | 3150 | 62 | 1.04 | 290 |
| Somasif W75/10 | 10 | 3190 | 56 | 1.06 | 300 |

Figure 16:
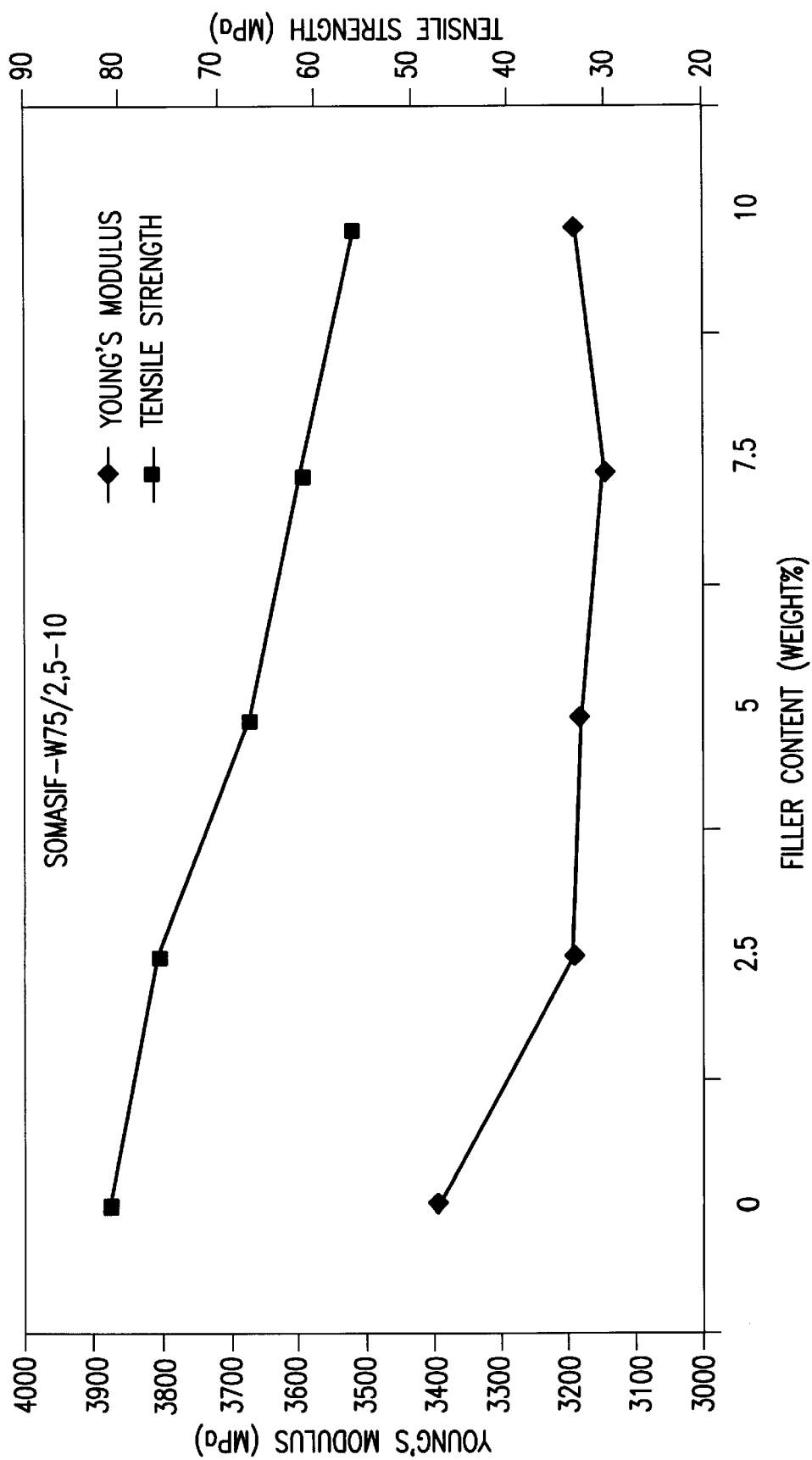

FIG. 16 shows the moduli of elasticity and the tensile strengths of the nanocomposites Somasif W75/2.5–10, and also of the unmodified moulded material.

Figure 17:
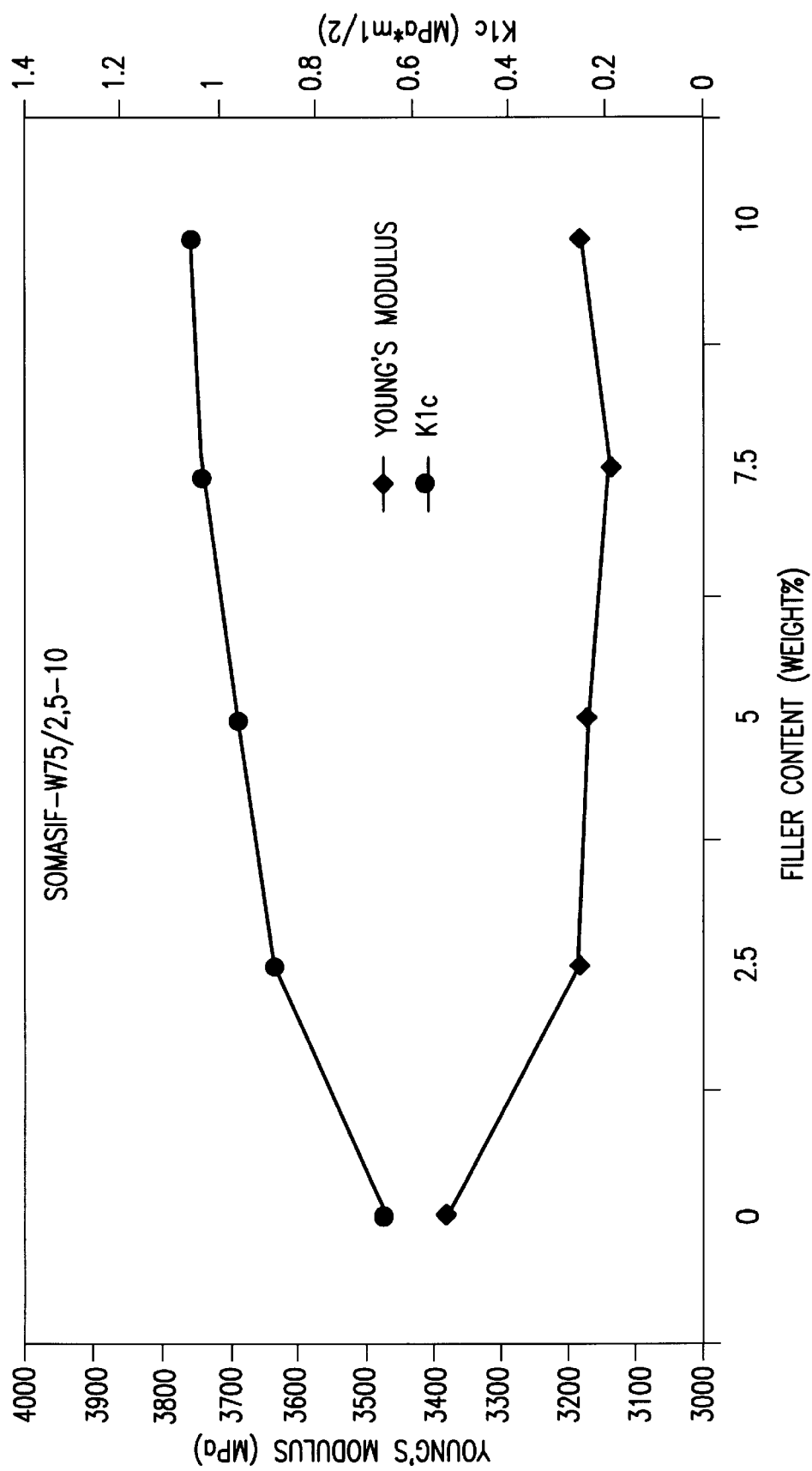

FIG. 17 shows the moduli of elasticity and the critical stress intensity factors (K1$_c$) of the nanocomposites Somasif W75/2.5–10, and also of the unmodified moulded material.

EXAMPLE 11

(Synthesis of the 10% by weight nanocomposites modified with epoxidized soya bean oil)

To prepare these nanocomposites, 1; 2.5; 5; 10; 20 and 50% by weight of the epoxy component (Araldit CY 225®) are replaced by epoxidized soya bean oil (ESO). The weight ratio selected here of the epoxy components mixture (Araldit CY 225® and epoxidized soya bean oil) to anhydride hardener (Araldit HY 925®) is once again 100:80. Each of these mixtures is then filled with 10% by weight (based on the total weight of the moulding to be produced) of the fillers prepared in Examples 5 and 7. Examples of the preparation of these nanocomposites will be described below taking the example of the nanocomposite filled with 10% by weight of Somasif HEODI (Example 5) and modified with 50% of ESO. 150 g of Araldit CY225®, 150 g of epoxidized soya bean oil and 60 g of Somasif HEODI in a metal container are stirred for 1 hour at 80° C./13 mbar in a planetary mixer, followed by addition of 240 g of Araldit HY 925®. This reaction mixture is pregelled at 80° C./13 mbar to a viscosity of about 20,000 mPas, with stirring and then, to produce mouldings, charged to steel moulds of dimensions 200× 200×4 mm and cured to completion for 14 hours at 140° C. The additional incorporation of the ESO results in no further extension of the distance between the layers.

Figure 18:
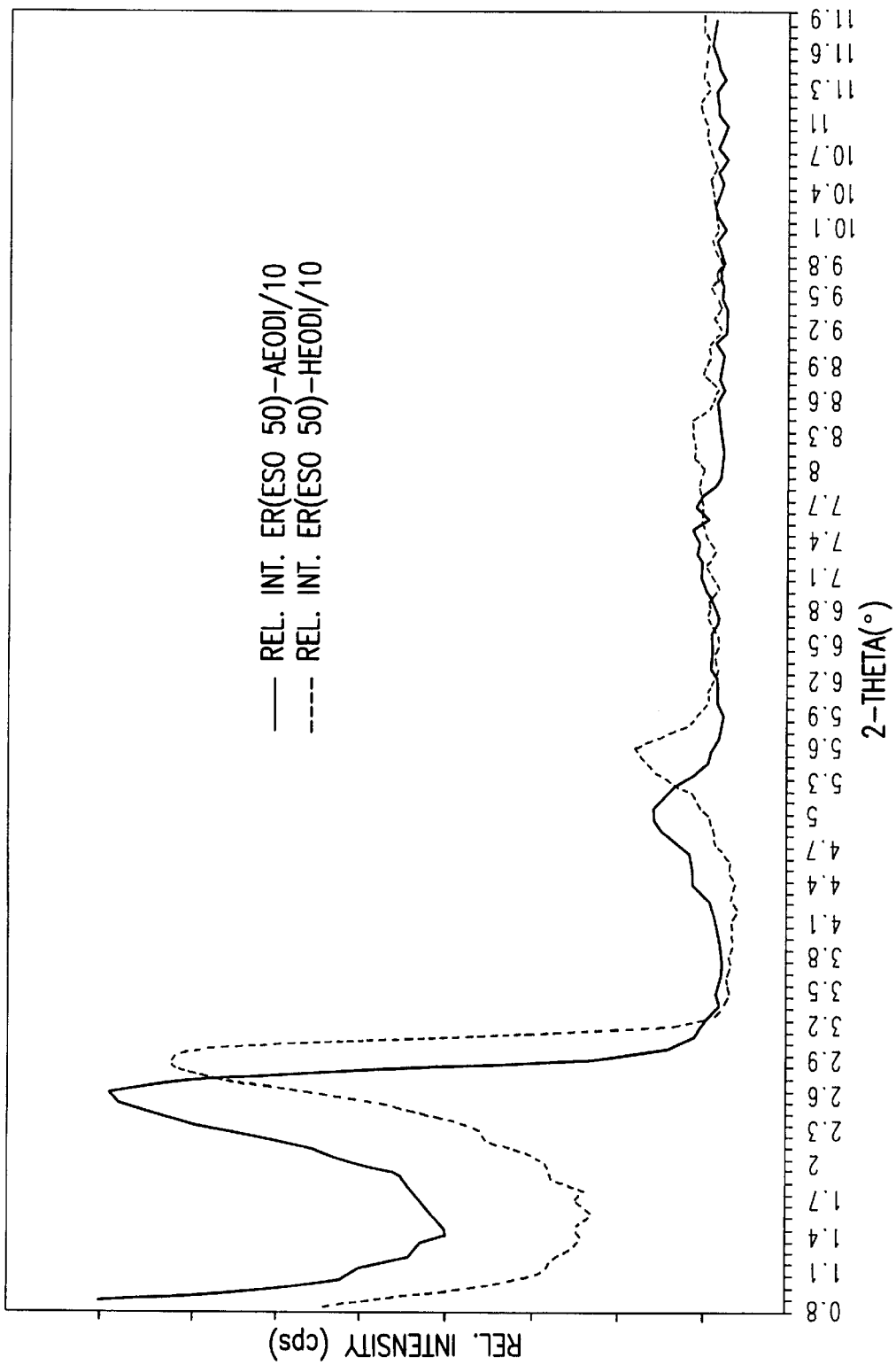

FIG. 18 shows the WAXS (wide-angled X-ray) image of the nanocomposites ER(ESO 50)-HEODI/10 and ER(ESO 50)-AEODV10.

Once again, test specimens are cut from the cast mouldings and subjected to the abovementioned mechanical tests. The resulting mechanical properties are given in Table 5:

TABLE 5

| Sample | Content of ESO (% by weight) | Filler content (% by weight) | Filler | Modulus (MPa) | Tensile strength (N/mm$^2$) | K1$_c$ (MPa·m$^{1/2}$) | G1$_c$ (J/m$^2$) |
|---|---|---|---|---|---|---|---|
| CY 225 | 0 | 0 | none | 3390 | 81 | 0.67 | 111 |
| ER(ESO 1) | 1 | 0 | none | 3130 | 125 | 0.61 | 98 |
| ER(ESO 2.5) | 2.5 | 0 | none | 3130 | 124 | 0.62 | 105 |
| ER(ESO 5) | 5 | 0 | none | 3120 | 114 | 0.61 | 100 |
| ER(ESO 10) | 10 | 0 | none | 3110 | 124 | 0.61 | 100 |
| ER(ESO 20) | 20 | 0 | none | 3040 | 123 | 0.61 | 104 |
| ER(ESO 50) | 50 | 0 | none | 2670 | 95 | 0.6 | 114 |
| ER-HEODI/10 | 0 | 10 | Somasif HEODI | 3460 | 58 | 0.99 | 240 |
| ER(ESO 1)-HEODI/10 | 1 | 10 | Somasif HEODI | 3540 | 111 | 1.09 | 307 |
| ER(ESO 2.5)-HEODI/10 | 2.5 | 10 | Somasif HEODI | 3520 | 107 | 1.13 | 334 |
| ER(ESO 5)-HEODI/10 | 5 | 10 | Somasif HEODI | 3560 | 107 | 1.15 | 340 |
| ER(ESO 10)-HEODI/10 | 10 | 10 | Somasif HEODI | 3470 | 107 | 1 | 265 |
| ER(ESO 20)-HEODI/10 | 20 | 10 | Somasif HEODI | 3440 | 102 | 1.04 | 289 |
| ER(ESO 50)-HEODI/10 | 50 | 10 | Somasif HEODI | 2930 | 88 | 0.96 | 287 |
| ER-AEODI/10 | 0 | 10 | Somasif AEODI | 3470 | 56 | 1.07 | 280 |
| ER(ESO 1)-AEODI/10 | 1 | 10 | Somasif AEODI | 3604 | 104 | 1.04 | 275 |
| ER(ESO 2.5)-AEODI/10 | 2.5 | 10 | Somasif AEODI | 3568 | 112 | 1.06 | 287 |
| ER(ESO 5)-AEODI/10 | 5 | 10 | Somasif AEODI | 3524 | 111 | 1.07 | 295 |
| ER(ESO 10)-AEODI/10 | 10 | 10 | Somasif AEODI | 3480 | 103 | 1.04 | 285 |
| ER(ESO 20)-AEODI/10 | 20 | 10 | Somasif AEODI | 3410 | 93 | 1 | 267 |
| ER(ESO 50)-AEODI/10 | 50 | 10 | Somasif AEODI | 2840 | 84 | 0.98 | 309 |

It can be clearly seen that incorporating epoxidized soya bean oil can not only prevent the tensile strength of the nanocomposites from falling but can even slightly improve this property.

Figure 19:
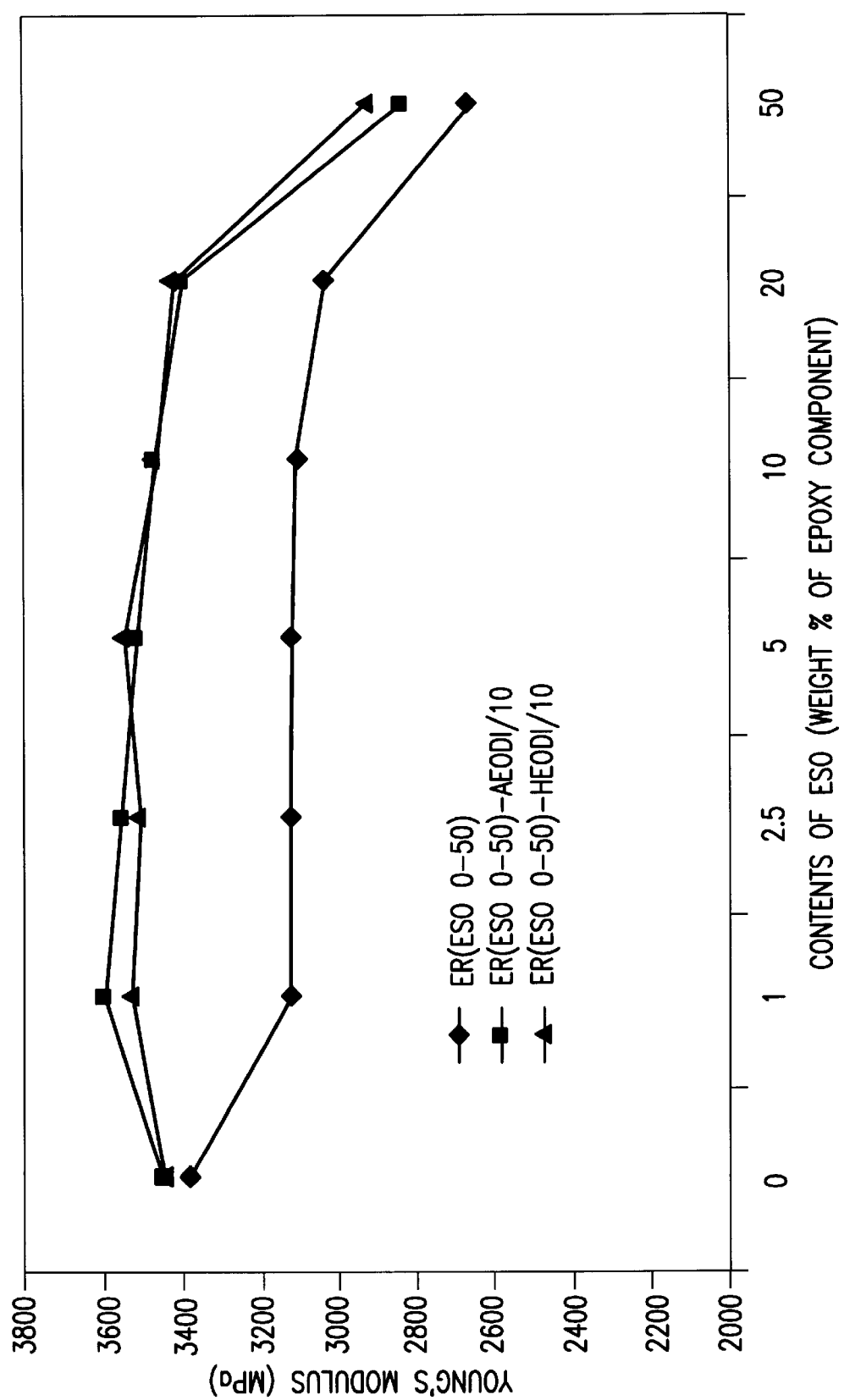

FIG. 19 shows the moduli of elasticity of the nanocomposites ER(ESO 1-50), ER(ESO 1-50)-HEODV10 and ER(ESO 1-50)-AEODI/10.

Figure 20:
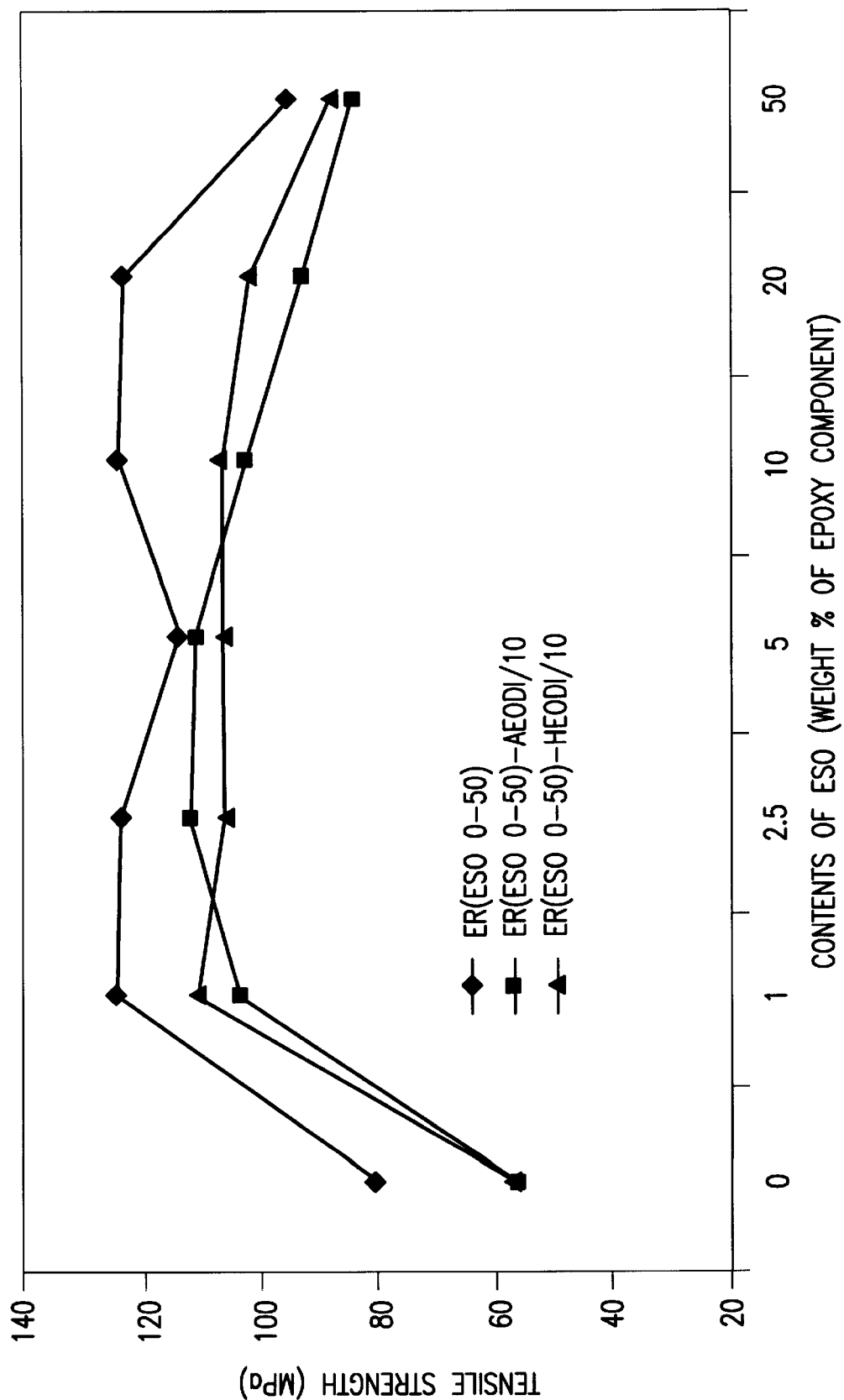

FIG. 20 shows the tensile strengths of the nanocomposites ER(ESO 1-50), ER(ESO 1-50)-HEODI/10 and ER(ESO 1-50)-AEODI/10.

Figure 21:
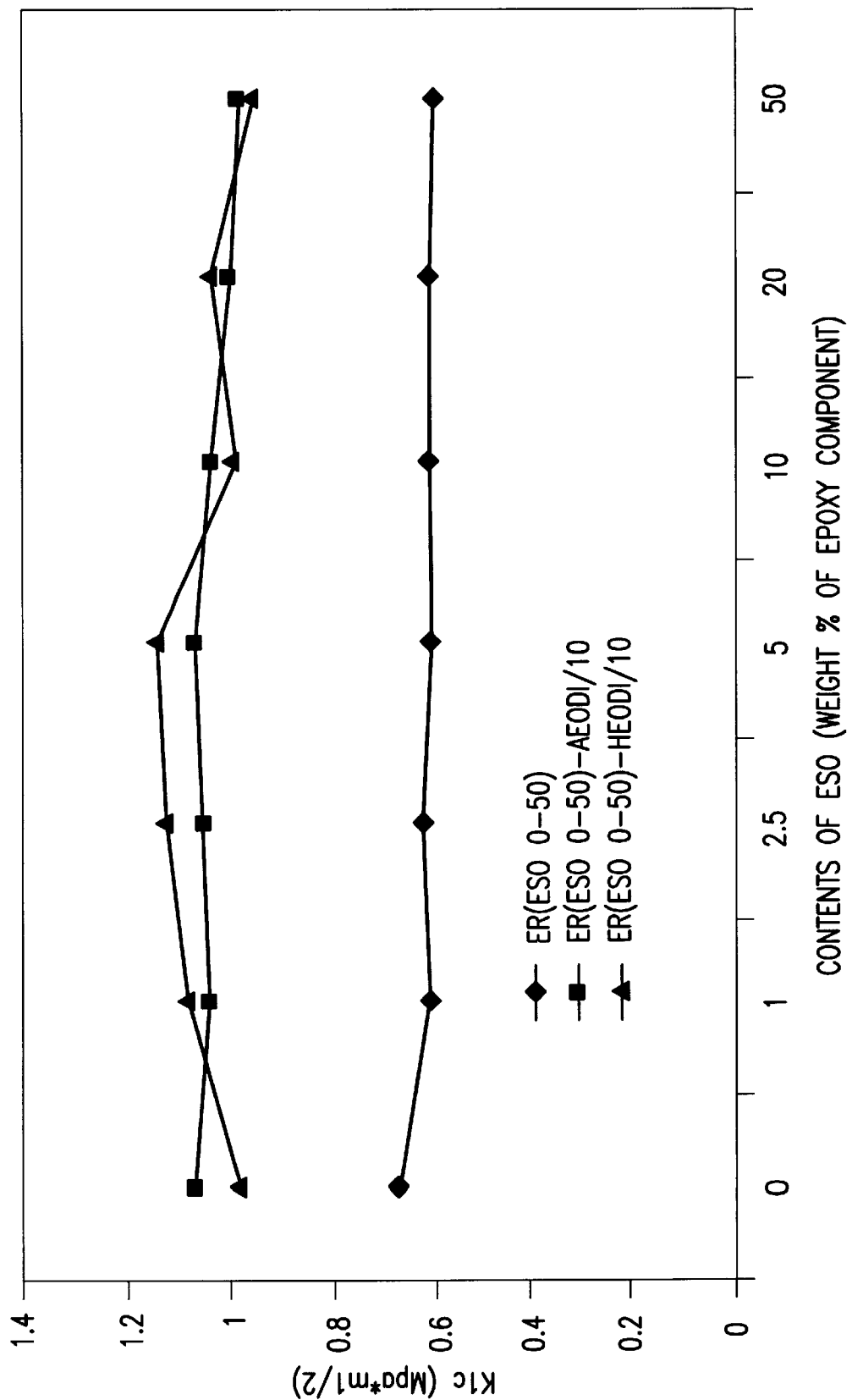

FIG. 21 shows the critical stress intensity factors ($K1_c$) of the nanocomposites ER(ESO 1-50), ER(ESO 1-50)-HEODI/10 and ER(ESO 1-50)-AEODI/10.

EXAMPLE 12

Synthesis the 10% by weight nanocomposites modified with n-dodecenyl succinate

To prepare these nanocomposites, 1; 2.5; 5; 10; 20 and 50% by weight of the epoxy component (Araldit HY 925®) are replaced by epoxidized n-dodecenyl succinate (DDS). The weight ratio selected here of the hardener components mixture (Araldit CY 225®) to anhydride hardener mixture (Araldit HY 925® and n-dodecnyl succinate) is once again 100:80. Each of these mixtures is then filled with 10% by weight (based on the total weight of the moulding to be produced) of the fillers prepared in Examples 5 and 7. Examples of the preparation of these nanocomposites will be described below taking the example of the nanocomposite filled with 10% by weight of Somasif HEODI (Example 5) and modified with 50% of DDS.

300g of Araldit CY 225® and 60 g of Somasif HEODI in a metal container are stirred for 1 hour at 80° C./13 mbar in a planetary mixer, followed by addition of 120 g of Araldit HY 925® and 120 g of DDS. This reaction mixture is pregelled at 80° C./13 mbar to a viscosity of about 20,000 mPas, with stirring and then, to produce mouldings, charged to steel moulds of dimensions 200×200×4 mm and cured to completion for 14 hours at 140° C. The additional incorporation of the DDS results in no further extension of the distance between the layers.

Figure 22:
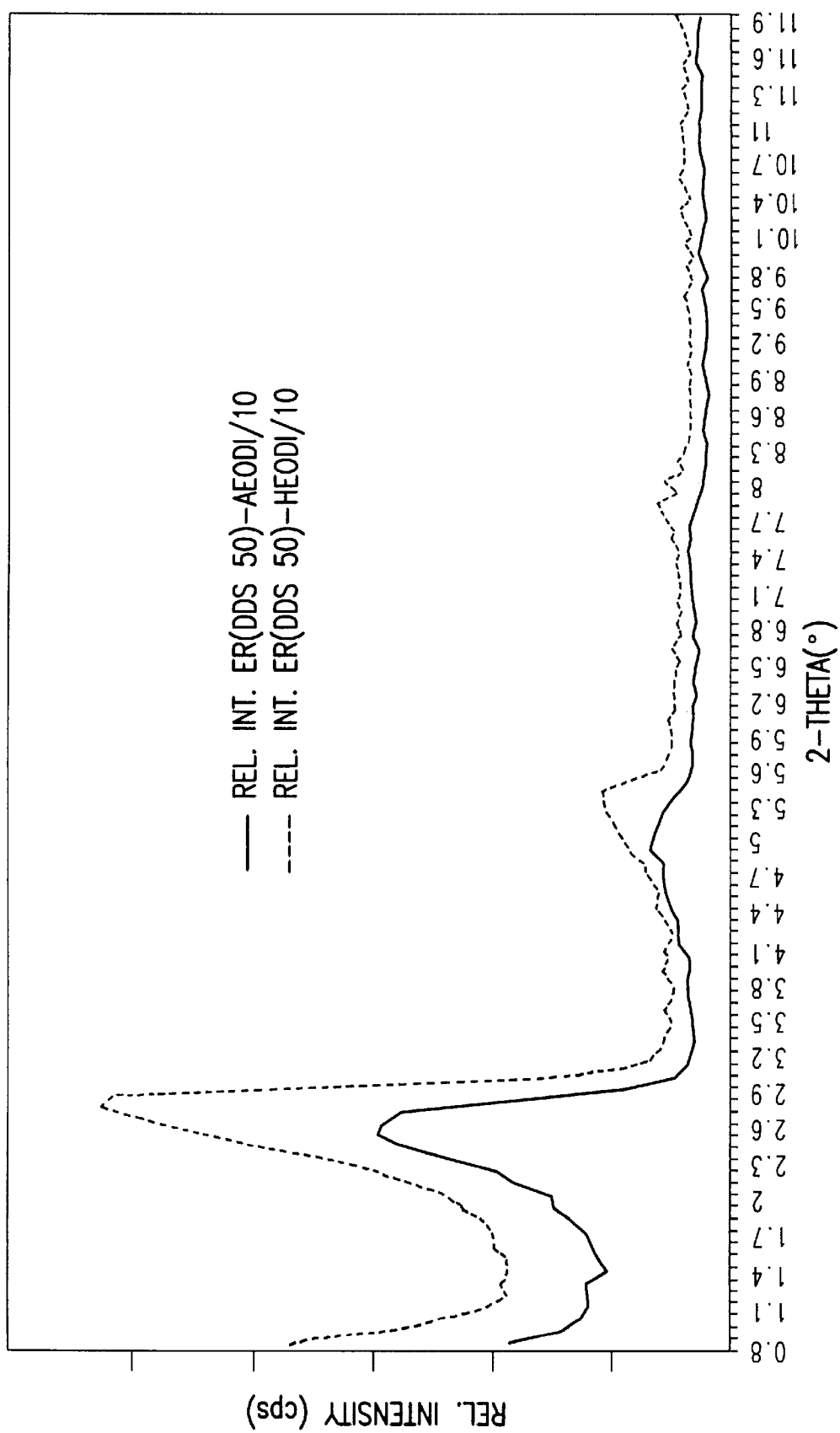

FIG. 22 shows the WAXS (wide-angle X-ray) image of the nanocomposites ER(DDS 50)-HEODI/10 and ER(DDS 50)-AEODI/10.

Once again, test specimens are cut from the cast mouldings and subjected to the abovementioned mechanical tests. The resulting mechanical properties are given in Table 6 above.

It can be clearly seen that the incorporation of n-dodecenyl succinate can not only prevent a fall in the tensile strength of the nanocomposites but can even improve this property slightly.

TABLE 6

| Sample | Content of DDS (% by weight) | Filler content (% by weight) | Filler | Modulus (MPa) | Tensile strength (N/mm$^2$) | $K1_c$ (MPa · m$^{1/2}$) | $G1_c$ (J/m$^2$) |
|---|---|---|---|---|---|---|---|
| CY 225 | 0 | 0 | none | 3390 | 81 | 0.67 | 111 |
| ER(DDS 1) | 1 | 0 | none | 3070 | 112 | 0.62 | 104 |
| ER(DDS 2.5) | 2.5 | 0 | none | 3050 | 126 | 0.61 | 104 |
| ER(DDS 5) | 5 | 0 | none | 3080 | 111 | 0.61 | 103 |
| ER(DDS 10) | 10 | 0 | none | 3060 | 122 | 0.64 | 113 |
| ER(DDS 20) | 20 | 0 | none | 2960 | 104 | 0.6 | 102 |
| ER(DDS 50) | 50 | 0 | none | 2760 | 79 | 0.59 | 106 |
| ER-HEODI/10 | 0 | 10 | Somasif HEODI | 3460 | 58 | 0.99 | 240 |
| ER(DDS 1)-HEODI/10 | 1 | 10 | Somasif HEODI | 3450 | 87 | 1 | 240 |
| ER(DDS 2.5)-HEODI/10 | 2.5 | 10 | Somasif HEODI | 3430 | 98 | 1 | 238 |
| ER(DDS 5)-HEODI/10 | 5 | 10 | Somasif HEODI | 3410 | 90 | 1.03 | 241 |
| ER(DDS 10)-HEODI/10 | 10 | 10 | Somasif HEODI | 3360 | 100 | 1.06 | 302 |
| ER(DDS 20)-HEODI/10 | 20 | 10 | Somasif HEODI | 3290 | 91 | 1.04 | 300 |
| ER(DDS 50)-HEODI/10 | 50 | 10 | Somasif HEODI | 2990 | 92 | 0.92 | 256 |
| ER-AEODI/10 | 0 | 10 | Somasif AEODI | 3470 | 56 | 1.07 | 280 |
| ER(DDS 1)-AEODI/10 | 1 | 10 | Somasif AEODI | 3460 | 86 | 1.03 | 248 |
| ER(DDS 2.5)-AEODI/10 | 2.5 | 10 | Somasif AEODI | 3470 | 103 | 1 | 261 |
| ER(DDS 5)-AEODI/10 | 5 | 10 | Somasif AEODI | 3450 | 98 | 1 | 265 |
| ER(DDS 10)-AEODI/10 | 10 | 10 | Somasif AEODI | 3450 | 105 | 1.04 | 284 |
| ER(DDS 20)-AEODI/10 | 20 | 10 | Somasif AEODI | 3430 | 95 | 0.97 | 251 |
| ER(DDS 50)-AEODI/10 | 50 | 10 | Somasif AEODI | 3010 | 84 | 0.91 | 248 |

Figure 23:
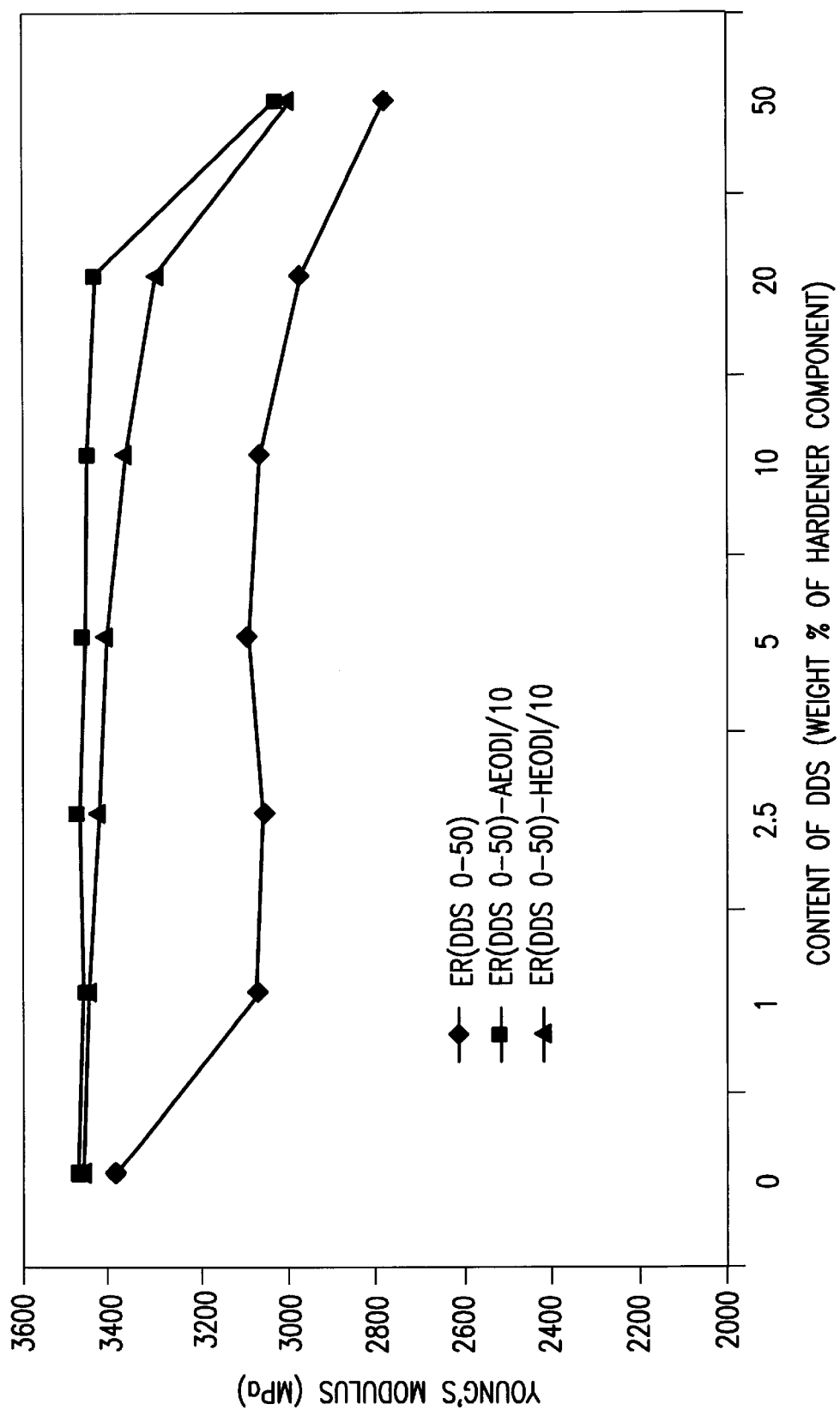

FIG. 23 shows the moduli of elasticity of the nanocomposites ER(DDS 1-50), ER(DDS 1-50)-HEODI/10 and ER(DDS 1-50)-AEODI/10.

Figure 24:
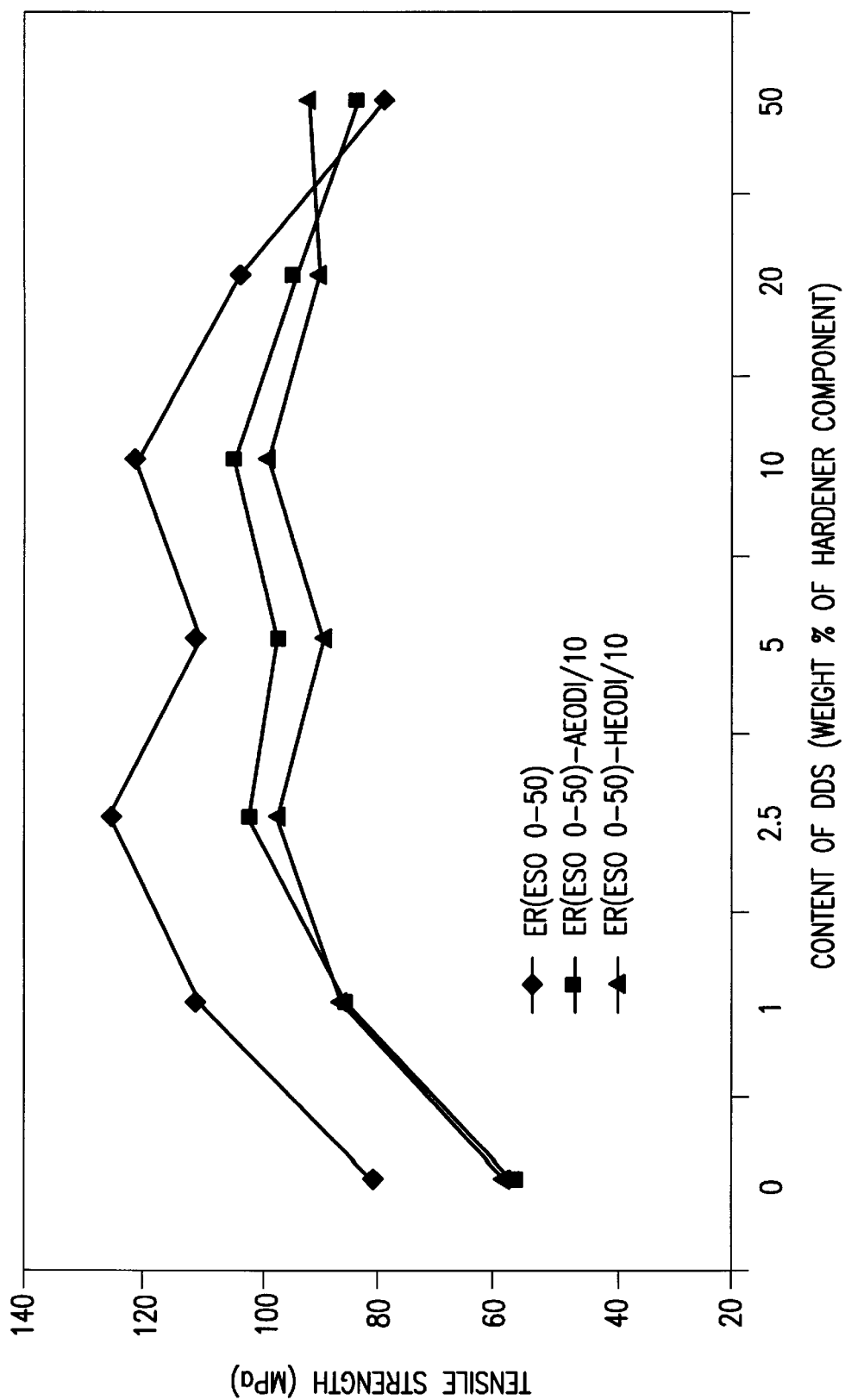

FIG. 24 shows the tensile strengths of the nanocomposites ER(DDS 1-50), ER(DDS 1-50)-HEODI/10 and ER(DDS 1-50)-AEODI/10.

Figure 25:
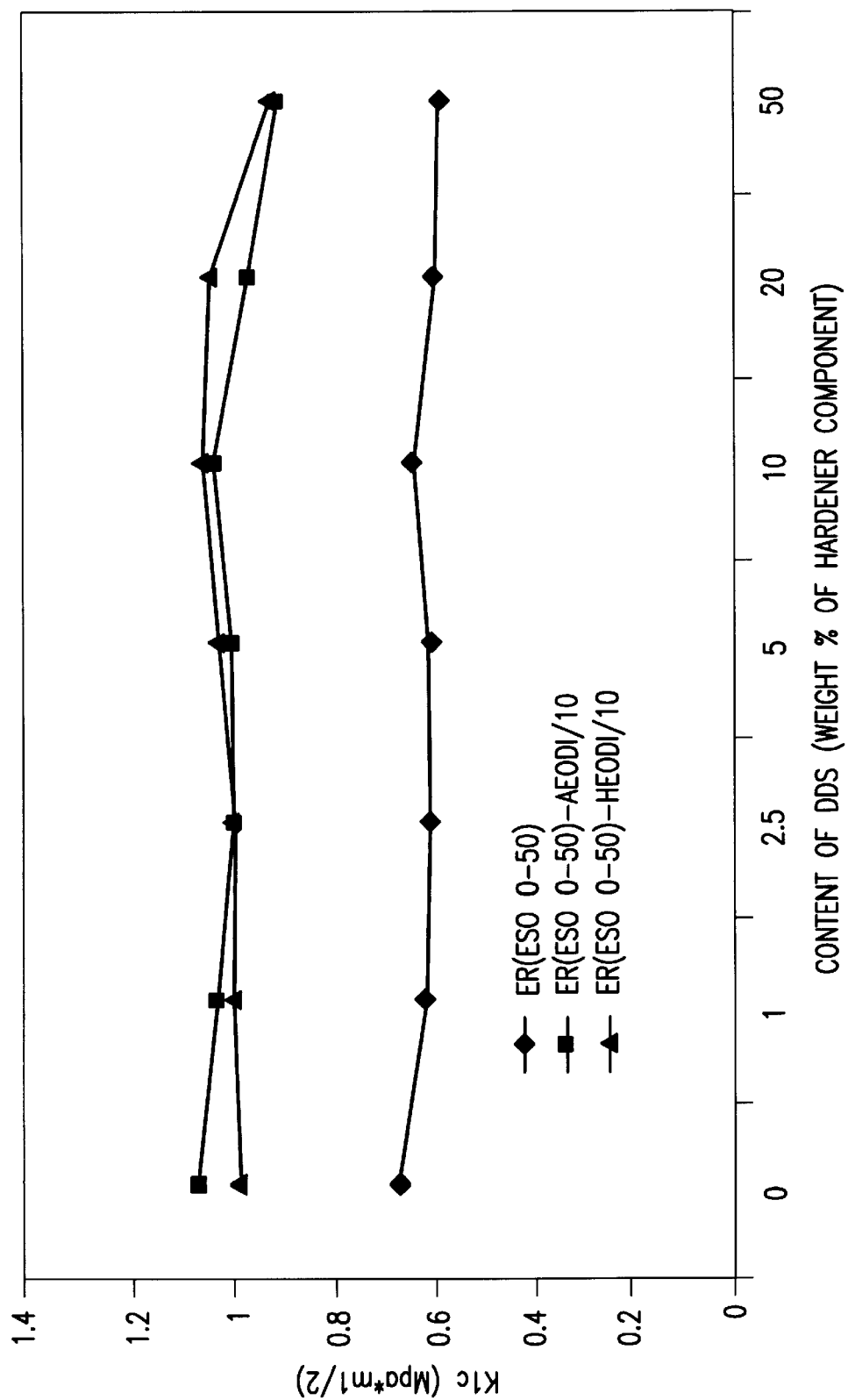

FIG. 25 shows the critical stress intensity factors (K1$_c$) of the nanocomposites ER(DDS 1-50), ER(DDS 1-50)-HEODI/10 and ER(DDS 1-50)-AEODI/10.

What is claimed is:

1. An organophilic phyllosilicate which has been prepared by treating a naturally occurring or synthetic phyllosilicate, or a mixture of such silicates, with a salt of a quaternary or other cyclic amidine compound or with a mixture of such salts.

2. An organophilic phyllosilicate according to claim 1, whose preparation uses naturally occurring or synthetic smectite clay minerals, bentonite, vermiculite and/or halloysite, and preferably montmorillonite, saponite, beidelite, nontronite, hectorite, sauconite or stevensite, and particularly preferably montmorillonite and/or hectorite.

3. An organophilic phyllosilicate according to claim 1, which has a distance between layers of from about 0.7 nm–1.2 nm (nanometers) and a cation-exchange capacity in the range from 50–200 meq/100 g.

4. An organophilic phyllosilicate according to claim 1, whose preparation has used a phyllosilicate of the formula $$(Al_{3.15}Mg_{0.85})Si_{8.00}O_{20}(OH)_4X_{11.8}\cdot nH_2O$$

in which X is an exchangeable cation, preferably sodium or potassium, and the hydroxyl groups given may, if desired, have been exchanged for fluorine ions.

5. An organophilic phyllosilicate according to claim 1, whose preparation has used a cyclic amidine compound of the formula (I):

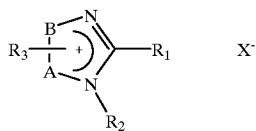

or has used a mixture of such compounds, in which $R_1$ is a linear or branched aliphatic radical having from 1 to 20 C atoms and may comprise one or more unsaturated bonds and/or one or more functional groups;

$R_2$ is hydrogen or a linear or branched aliphatic radical having from 1 to 20 C atoms which contains one or more unsaturated bonds and/or one or more functional groups and, if desired, has interruption by one or more —NH— groups or by one or more oxygen atoms;

$R_3$ is hydrogen or a linear or branched aliphatic radical having from 1 to 8 C atoms which may contain one or more unsaturated bonds;

A is —CH$_2$— or —CH$_2$—CH$_2$—;

B is —CH$_2$—; or

A and B together are a radical of the formula —(CH=CH)—, or a radical of the formula =CH—CH= or =CH—CH$_2$—CH= and both of these radicals are part of an annellated, substituted or unsubstituted, cyclohexyl ring, and X$^-$ is any desired anion.

6. An organophilic phyllosilicate according to claim 5, wherein $R_1$ is the alkyl radical of a saturated, or the alkenyl radical of an unsaturated, fatty acid or hydroxyl fatty acid having from 8 to 20 C atoms, or (C$_2$–C$_8$)alkyl, unsubstituted or substituted by a carboxyl group or by a (C$_1$–C$_3$)alkoxycarbonyl group, $R_2$ is hydrogen or an aliphatic radical having from 1 to 8 C atoms which contains an unsaturated bond and which may be substituted by a carboxyl group or by a (C$_1$–C$_{20}$)alkoxycarbonyl group or by a cyclohexylcarbonyl group or by a phenylcarboxyl group, and may, if desired, have interruption by —NH— or by oxygen, $R_3$ is hydrogen or (C$_1$–C$_4$)alkyl;

each of A and B is —CH$_2$—; or

A and B together are the radical —(CH=CH)—, and

X$^-$ is any desired anion.

7. An organophilic phyllosilicate according to claim 1, whose preparation has used a cyclic amidine compound of the formula (I'):

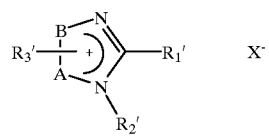

in which $R_1'$ is the alkenyl radical of 12-hydroxyoleic acid or the alkyl radical of hydrogenated ricinoleic acid (12-hydroxystearic acid), $R_2'$ is hydrogen, or an aliphatic radical having from 1 to 4 C atoms which is unsubstituted or substituted by a (C$_1$–C$_{20}$)alkoxycarbonyl group;

$R_3'$ is hydrogen, methyl or ethyl; each of A and B is —CH$_2$—; or

A and B together are the radical —(CH=CH)—, and

X$^-$ is any desired anion.

8. An organophilic phyllosilicate according to claim 1, whose preparation has used a cyclic amidine compound of the formula

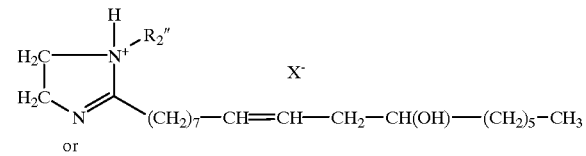

or

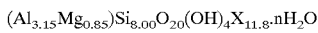

in which $R_2''$ is hydrogen, methyl, ethyl, propyl or butyl, and

X$^-$ is any desired anion,

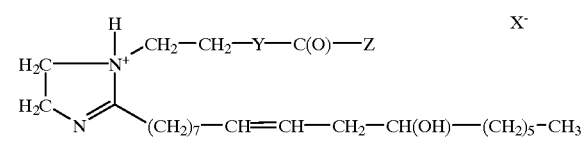

or

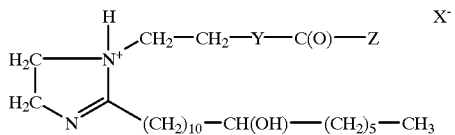

or has used a mixture of these compounds, in which
Y is —O— or —NH—;
Z is a $(C_{12}-C_{20})$alkyl radical or a $(C_{12}-C_{20})$alkenyl radical of an appropriate fatty acid, and
$X^-$ is any desired anion.

9. A thermoplastic polymer which comprises an organophilic phyllosilicate according to claim 1, or a mixture of such phyllosilicates.

10. A thermosetting polymer system, which comprises an organophilic phyllosilicate according to claim 1 or a mixture of such phyllosilicates.

11. An epoxy resin system according to claim 10, which comprises (a) an epoxy resin having more than one 1,2-epoxy group in the molecule and (b) at least one hardener.

12. An epoxy resin system according to claim 10, which comprises a liquid or viscous polyglycidyl ether or polyglycidyl ester or a mixture of such compounds, preferably a liquid or viscous bisphenol diglycidyl ether, and also a mixture with an epoxidized oil.

13. An epoxy resin system according to claim 10, which comprises a hardener which is selected from the group consisting of amines, carboxylic acids, carboxylic anhydrides or phenols, or comprises a mixture of these hardeners or a catalytic hardener, which is an imidazole.

14. A polyurethane which comprises an organophilic phyllosilicate according to claim 1 or a mixture of such phyllosilicates.

15. A polyurethane according to claim 14, which is a crosslinked polyurethane and comprises, as structural components, polyisocyanates, polyols and, if desired, polyamines, in each case having two or more of the appropriate functional groups per molecule.

16. A rubber which comprises an organophilic phyllosilicate according to claim 1 or comprises a mixture of such phyllosilicates.

17. A polymer system according to claim 10, which comprises fillers, pigments, dyes, flow control agents and/or plasticizers.

18. A polymer system according to claim 10, which comprises the organophilic phyllosilicates in amounts of from 0.5 to 30 per cent by weight, based on the total weight of the matrix.

19. A polymer system according to claim 10, wherein the total amount of organophilic phyllosilicate and filler, based on the total weight of the matrix, is up to 70 per cent by weight.

20. A polymer system according to claim 10, in which the fillers present are powdered quartz, wollastonite and/or chalk.

21. An organophilic phyllosilicate according to claim 1, which has been treated with a polymerizable monomer or with a mixture of such monomers, where these monomers are selected from the class consisting of the acrylate monomers, methacrylate monomers, caprolactam, laurolactam, aminoundecanoic acid, aminocaproic acid and aminododecanoic acid.

22. A shapable moulding material or a finished moulding in the form of a composite material, in particular in the form of a nanocomposite, which comprises a phyllosilicate according to claim 1 or a mixture of such phyllosilicates.

23. A coating material, an adhesive, a casting resin, a coating, a flame retardant, an agent for thixotropic effect or a reinforcing agent which comprises an organophilic phyllosilicate according to claim 1.

24. An organophilic phyllosilicate according to claim 5, wherein $X^-$ is $F^-$, $Cl^-$, $Br^-$, $I^-$, $SO_4^{2-}$, $C_6H_5SO_3^-$, $CH_3SO_4^-$, $(HCOO)^-$, or $(CH_3COO)^-$.

25. An organophilic phyllosilicate according to claim 6, where in $R_1$, the fatty acid has from 12 to 20 C atoms.

26. An organophilic phyllosilicate according to claim 6, where in $R_1$, the fatty acid has from 12 to 20 C atoms.

* * * * *